United States Patent
Kawano et al.

(10) Patent No.: US 12,120,598 B2
(45) Date of Patent: Oct. 15, 2024

(54) TERMINAL APPARATUS, METHOD, AND INTEGRATED CIRCUIT

(71) Applicant: SHARP KABUSHIKI KAISHA, Sakai (JP)

(72) Inventors: Takuma Kawano, Sakai (JP); Shohei Yamada, Sakai (JP); Hidekazu Tsuboi, Sakai (JP); Kyosuke Inoue, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 340 days.

(21) Appl. No.: 17/690,578

(22) Filed: Mar. 9, 2022

(65) Prior Publication Data

US 2023/0247533 A1 Aug. 3, 2023

(30) Foreign Application Priority Data

Feb. 2, 2022 (JP) .................. 2022-015195

(51) Int. Cl.
*H04W 48/16* (2009.01)
*H04W 76/27* (2018.01)

(52) U.S. Cl.
CPC ........... *H04W 48/16* (2013.01); *H04W 76/27* (2018.02)

(58) Field of Classification Search
CPC ................. H04W 48/16; H04W 76/27; H04W 36/00695; H04W 36/362; H04W 76/15; H04W 36/0055; H04W 36/02; H04W 36/26; H04W 36/34
See application file for complete search history.

(56) References Cited

U.S. PATENT DOCUMENTS

| | | | |
|---|---|---|---|
| 2023/0292195 A1* | 9/2023 | Bergqvist | H04W 36/0079 |
| 2023/0363027 A1* | 11/2023 | Da Silva | H04W 76/20 |
| 2024/0040451 A1* | 2/2024 | Da Silva | H04W 36/00698 |
| 2024/0056917 A1* | 2/2024 | Kim | H04W 36/362 |

* cited by examiner

*Primary Examiner* — Mazda Sabouri
(74) *Attorney, Agent, or Firm* — ScienBiziP, P.C.

(57) ABSTRACT

A terminal apparatus determines whether a candidate special cell (SpCell) associated with a conditional reconfiguration information element of an entry included in an entry list is identical to a special cell (SpCell) currently configured for the terminal apparatus, and does not cause an execution condition to be evaluated, the execution condition being included in the entry including the conditional reconfiguration information element of which the associated candidate SpCell is identical to the SpCell currently configured for the terminal apparatus.

3 Claims, 9 Drawing Sheets

```
RRCReconfiguration ::=           SEQUENCE {
    rrc-TransactionIdentifier    RRC-TransactionIdentifier,
    criticalExtensions           CHOICE {
        rrcReconfiguration           RRCReconfiguration-IEs,
        criticalExtensionsFutures    SEQUENCE {}
    }
}
<PARTLY OMITTED>
RRCReconfiguration-v1560-IEs ::=    SEQUENCE {
    mrdc-SecondaryCellGroupConfig       SetupRelease { MRDC-SecondaryCellGroupConfig }      OPTIONAL,  -- Need M
<PARTLY OMITTED>
}
RRCReconfiguration-v1610-IEs ::= SEQUENCE {
<PARTLY OMITTED>
    conditionalReconfiguration-r16   ConditionalReconfiguration-r16    OPTIONAL,  -- Need M
<PARTLY OMITTED>
}
MRDC-SecondaryCellGroupConfig ::=   SEQUENCE {
    mrdc-ReleaseAndAdd                 ENUMERATED {true}                 OPTIONAL,  -- Need N
    mrdc-SecondaryCellGroup            CHOICE {
        nr-SCG                             OCTET STRING (CONTAINING RRCReconfiguration),
        eutra-SCG                          OCTET STRING
    }
}
<OMITTED>
```

FIG. 7

TERMINAL APPARATUS, METHOD, AND INTEGRATED CIRCUIT

TECHNICAL FIELD

The present invention relates to a terminal apparatus, a method, and an integrated circuit.

BACKGROUND ART

The 3rd Generation Partnership Project (3GPP), a standardization project for cellular mobile communication systems has performed technical study and standardization for cellular mobile communication systems including radio access, core networks, services, and the like.

For example, the 3GPP has started the technical study and standardization for Evolved Universal Terrestrial Radio Access (E-UTRA) as a radio access technology (RAT) for the 3.9-th and 4th generation cellular mobile communication systems. The technical study and standardization for advanced technologies of E-UTRA are still underway in the 3GPP. Further, E-UTRA is also referred to as Long Term Evolution (LTE), and its advanced technologies are also called LTE-Advanced (LTE-A) and LTE-Advanced Pro (LTE-A Pro).

In addition, the 3GPP has started the technical study and standardization for New Radio (NR) or NR Radio access as a radio access technology (RAT) for the 5th generation (5G) cellular mobile communication systems. Technical study and standardization for advanced technologies of NR are still underway in the 3GPP.

CITATION LIST

NPL

NPL 1: 3GPP TS 38.300 v16.4.0, "NR; NR and NG-RAN Overall description; Stage 2", pp 10-134

NPL 2: 3GPP TS 36.300 v16.4.0, "Evolved Universal Terrestrial Radio Access (E-UTRA) and Evolved Universal Terrestrial Radio Access Network (E-UTRAN); Overall description; Stage 2", pp 19-362

NPL 3: 3GPP TS 38.331 v16.3.1, "NR; Radio Resource Control (RRC); Protocol specifications", pp 21-881

NPL 4: 3GPP TS 36.331 v16.3.0, "Evolved Universal Terrestrial Radio Access (E-UTRA); Radio Resource Control (RRC); Protocol specifications", pp 25-1015

NPL 5: 3GPP TS 37.340 v16.4.0, "Evolved Universal Terrestrial Radio Access (E-UTRA) and NR; Multi-Connectivity; Stage 2", pp 7-77

NPL 6: 3GPP TS 38.321 v16.3.0, "NR; Medium Access Control (MAC) protocol specification", pp 8-152

SUMMARY OF INVENTION

Technical Problem

In NR, the technique of handover or PSCell change for switching a cell in which a terminal apparatus communicates has been used. Also, the technique called PSCell addition for adding a cell group in which a terminal apparatus communicates has also been used and implemented with the technique called an RRC connection reconfiguration (RRCReconfiguration) in conjunction with handover and PSCell change. Furthermore, the technique called a conditional reconfiguration (conditionalReconfiguration) for reconfiguring RRC connection based on a preconfigured execution condition has been used. However, with respect to 5G Advanced (Release 18 and the followings) to be studied from now on, further expansion of the mobility technologies will be examined, but details thereof have not yet been discussed.

An aspect of the present invention has been made in light of the above-described circumstances, and an objective of the present invention is to provide a terminal apparatus, a method, and an integrated circuit that enable efficient communication control.

Solution to Problem

In order to accomplish the objective described above, an aspect of the present invention is contrived to provide the following means. That is, an aspect of the present invention is a terminal apparatus for communicating with a base station apparatus, the terminal apparatus including a receiver that receives radio resource control (RRC) signaling transmitted from the base station apparatus, and a processing unit that holds an entry list, in which the entry list includes one or more entries, an entry of the one or more entries includes a conditional reconfiguration information element associated with one candidate special cell (SpCell) and one or more execution conditions, the processing unit adds one or more entries to the entry list and/or modifies one or more entries of the entry list based on an entry addition/modification list included in information related to a conditional reconfiguration of the received RRC signaling, and the processing unit further determines whether the candidate SpCell associated with the conditional reconfiguration information element of the entry is identical to an SpCell currently configured for the terminal apparatus, and causes an execution condition of the one or more execution conditions to not be evaluated, the execution condition being included in the entry including the conditional reconfiguration information element of which the associated candidate SpCell is identical to the SpCell currently configured for the terminal apparatus.

In addition, an aspect of the present invention is a method of a terminal apparatus for communicating with a base station apparatus, the method including receiving radio resource control (RRC) signaling transmitted from the base station apparatus, holding an entry list, adding one or more entries to the entry list and/or modifying one or more entries of the entry list based on an entry addition/modification list included in information related to a conditional reconfiguration of the received RRC signaling, and further determining whether one candidate special cell (SpCell) associated with a conditional reconfiguration information element of an entry of the one or more entries is identical to a special cell (SpCell) currently configured for the terminal apparatus and not causing an execution condition to not be evaluated, the execution condition being included in the entry including the conditional reconfiguration information element of which the associated candidate SpCell is identical to the SpCell currently configured for the terminal apparatus, in which the entry list includes one or more entries, and the one entry includes the conditional reconfiguration information element associated with the candidate special cell (SpCell) and one or more execution conditions.

In addition, an aspect of the present invention is an integrated circuit mounted on a terminal apparatus for communicating with a base station apparatus, the integrated circuit causing the terminal apparatus to perform receiving radio resource control (RRC) signaling transmitted from the base station apparatus, holding an entry list, adding one or more entries to the entry list and/or modifying one or more entries of the entry list based on an entry addition/modification list included in information related to a conditional reconfiguration of the received RRC signaling, and further determining whether one candidate special cell (SpCell) associated with a conditional reconfiguration information element of an entry of the one or more entries is identical to a special cell (SpCell) currently configured for the terminal apparatus and not causing an execution condition to be evaluated, the execution condition being included in the entry including the conditional reconfiguration information element of which the associated candidate SpCell is identical to the SpCell currently configured for the terminal apparatus, in which the entry list includes one or more entries, and the one entry includes the conditional reconfiguration information element associated with the candidate special cell (SpCell) and one or more execution conditions.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to an aspect of the present invention, the terminal apparatus, the method, and the integrated circuit can implement efficient communication control processing.

BRIEF DESCRIPTION OF DRAWINGS

FIG. 7 illustrates an exemplary description of ASN.1 included in a message regarding reconfiguration of an RRC connection in NR according to the present embodiment.

DESCRIPTION OF EMBODIMENTS

A present embodiment of the invention will be described below in detail with reference to the drawings.

LTE (and LTE-A and LTE-A Pro) and NR may be defined as different radio access technologies (RATs). In addition, NR may be defined as a technique included in LTE. In addition, LTE may be defined as a technique included in NR. In addition, LTE that is connectable to NR in Multi-Radio Dual Connectivity (MR-DC) may be distinguished from existing LTE. In addition, LTE in which 5GC is used as a core network (CN) may be distinguished from existing LTE in which EPC is used as a core network. Further, existing LTE may be LTE that does not implement the techniques standardized from Release 15 by the 3GPP. The present embodiment may be applied to NR, LTE and other RATs. Although the present embodiment will be described using terms related to LTE and NR in the following description, the present embodiment may be applied to other techniques using other terms. In addition, the term "E-UTRA" used in the present embodiment may be replaced with the term "LTE", and the term "LTE" may be replaced with the term "E-UTRA".

Further, although the name of each node or entity in a case that the radio access technology is E-UTRA or NR, and processes and the like at each node or entity will be described in the present embodiment, the present embodiment may be used in other radio access technologies. The name of each node or entity in the present embodiment may be separate names.

Figure 1:
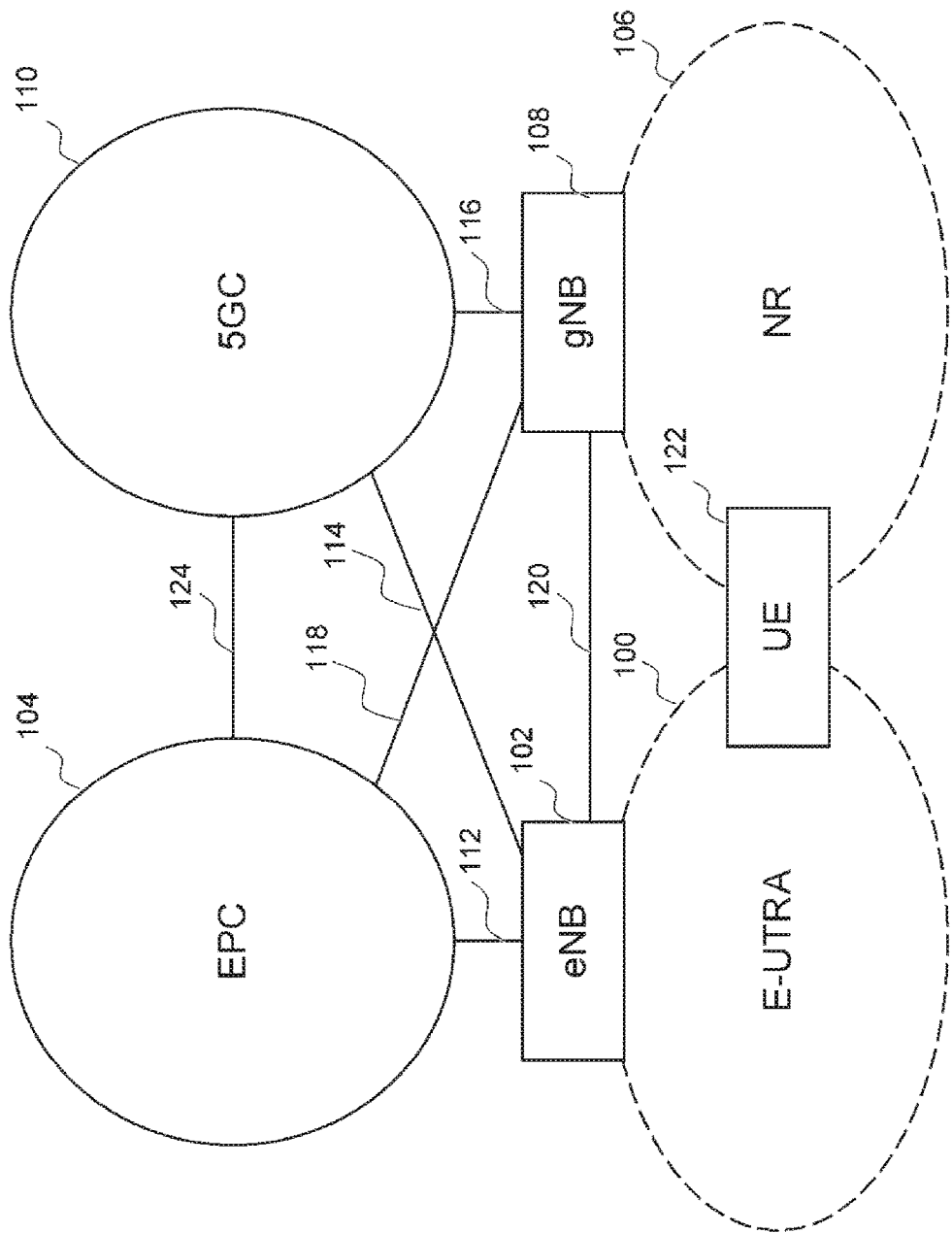
FIG. 1 is a schematic diagram of a communication system according to a present embodiment.

FIG. 1 is a schematic diagram of a communication system according to the present embodiment. Further, a node, a radio access technology, a core network, an interface, and the like each have some functions, described with reference to FIG. 1, that are closely related to the present embodiment, and each may have other functions.

E-UTRA 100 may be a radio access technology. The E-UTRA 100 may be an air interface between UE 122 and an eNB 102. The air interface between the UE 122 and the eNB 102 may be referred to as a Uu interface. The eNB (E-UTRAN Node B) 102 may be a base station apparatus of the E-UTRA 100. The eNB 102 may have an E-UTRA protocol described below. An E-UTRA protocol may include an E-UTRA user plane (UP) protocol and an E-UTRA control plane (CP) protocol which will be described below. The eNB 102 may terminate an E-UTRA user plane (UP) protocol and an E-UTRA control plane (CP) protocol for the UE 122. A radio access network included in the eNB may be referred to as E-UTRAN.

An Evolved Packet Core (EPC) 104 may be a core network. An interface 112 is an interface between the eNB 102 and the EPC 104, and may be referred to as an S1 interface. The interface 112 may include a control plane interface through which control signals pass and/or a user plane interface through which user data passes. The control plane interface of the interface 112 may be terminated by Mobility Management Entity (MME, which is not illustrated) included in the EPC 104. The user plane interface of the interface 112 may be terminated by a serving gateway (S-GW, which is not illustrated) included in the EPC 104. The control plane interface of the interface 112 may be referred to as an S1-MME interface. The user plane interfaces of the interface 112 may be referred to as an S1-U interface.

Further, one or more eNBs 102 may be connected to the EPC 104 via the interface 112. An interface may exist between multiple eNBs 102 connected to the EPC 104 (not illustrated). An interface existing between multiple eNBs 102 connected to the EPC 104 may be referred to as an X2 interface.

NR 106 may be a radio access technology. The NR 106 may be an air interface between the UE 122 and a gNB 108. The air interface between the UE 122 and the gNB 108 may be referred to as a Uu interface. The gNB (g NodeB) 108 may be a base station apparatus of the NR 106. The gNB 108 may have an NR protocol described below. The NR protocol may include an NR user plane (UP) protocol and an NR control plane (CP) protocol which will be described below.

The gNB 108 may terminate the NR user plane (UP) protocol and the NR control plane (CP) protocol for the UE 122.

A 5GC 110 may be a core network. An interface 116 is an interface between the gNB 108 and the 5GC 110, and may be referred to as an NG interface. The interface 116 may include a control plane interface through which control signals pass and/or a user plane interface through which user data passes. The control plane interface of the interface 116 may be terminated by an Access and mobility Management Function (AMF, which is not illustrated) included in the 5GC 110. The user plane interface of the interface 116 may be terminated by a User Plane Function (UPF, which is not illustrated) included in the 5GC 110. The control plane interface of the interface 116 may be referred to as an NG-C interface. The user plane interfaces of the interface 116 may be referred to as an NG-U interface.

Further, one or more gNBs 108 may be connected to the 5GC 110 via the interface 116. There may be an interface between multiple gNBs 108 connected to the 5GC 110 (not illustrated). The interface between multiple gNBs 108 connected to the 5GC 110 may be referred to as an Xn interface.

The eNB 102 may have a function to connect to the 5GC 110. The eNB 102 having the function to connect to the 5GC 110 may be referred to as an ng-eNB. An interface 114 is an interface between the eNB 102 and the 5GC 110, and may be referred to as an NG interface. The interface 114 may include a control plane interface through which control signals pass and/or a user plane interface through which user data passes. The control plane interface of the interface 114 may be terminated by an AMF included in the 5GC 110. The user plane interface of the interface 114 may be terminated by the UPF included in the 5GC 110. The control plane interface of the interface 114 may be referred to as an NG-C interface. The user plane interfaces of the interface 114 may be referred to as an NG-U interface. A radio access network including the ng-eNB or the gNB may be referred to as an NG-RAN. The NG-RAN, E-UTRAN, or the like may be simply referred to as a network. In addition, the network may include an eNB, an ng-eNB, a gNB, and the like.

Further, one or more eNBs 102 may be connected to the 5GC 110 via the interface 114. There may be an interface between multiple eNBs 102 connected to the 5GC 110 (not illustrated). The interface between multiple eNBs 102 connected to the 5GC 110 may be referred to as an Xn interface. In addition, the eNB 102 connected to the 5GC 110 and the gNB 108 connected to the 5GC 110 may be connected via an interface 120. The interface 120 between the eNB 102 connected to the 5GC 110 and the gNB 108 connected to the 5GC 110 may be referred to as an Xn interface.

The gNB 108 may have a function of connecting to the EPC 104. The gNB 108 having the function of connecting to the EPC 104 may be referred to as an en-gNB. An interface 118 is an interface between the gNB 108 and the EPC 104, and may be referred to as an S1 interface. The interface 118 may include a user plane interface through which user data passes. The user plane interface of the interface 118 may be terminated by an S-GW (not illustrated) included in the EPC 104. The user plane interfaces of the interface 118 may be referred to as an S1-U interface. In addition, the eNB 102 connected to the EPC 104 and the gNB 108 connected to the EPC 104 may be connected via the interface 120. The interface 120 between the eNB 102 connected to the EPC 104 and the gNB 108 connected to the EPC 104 may be referred to as an X2 interface.

An interface 124 is an interface between the EPC 104 and the 5GC 110, and may be an interface which passes a CP alone, or a UP only, or both the CP and UP. In addition, some or all of the interface 114, the interface 116, the interface 118, the interface 120, the interface 124, and the like may not be provided depending on a communication system provided by a network operator.

The UE 122 may be a terminal apparatus capable of receiving system information or a paging message transmitted from the eNB 102 and/or the gNB 108. In addition, the UE 122 may be a terminal apparatus capable of wirelessly connecting to the eNB 102 and/or the gNB 108. In addition, the UE 122 may be a terminal apparatus capable of simultaneously performing a radio connection to the eNB 102 and a radio connection to the gNB 108. The UE 122 may have an E-UTRA protocol, and/or an NR protocol. Further, a radio connection may be a Radio Resource Control (RRC) connection.

In addition, the UE 122 may be a terminal apparatus capable of connecting to the EPC 104 and/or the 5GC 110 via the eNB 102 and/or the gNB 108. In a case that a connection destination core network of the eNB 102, and/or the gNB 108 with which the UE 122 communicates is the EPC 104, each data radio bearer (DRB), which will be described below, established between the UE 122, the eNB 102, and/or the gNB 108 may also be uniquely linked to each evolved packet system (EPS) bearer that passes in the EPC 104. Each EPS bearer may be identified with an EPS bearer identity (or ID). In addition, an identical QoS may be ensured for data such as an IP packet passing through an identical EPS bearer or an Ethernet (trade name) frame.

In addition, in a case that a connection destination core network of the eNB 102 and/or the gNB 108 with which the UE 122 communicates is the 5GC 110, each DRB established between the UE 122, the eNB 102 and/or the gNB 108 may be further linked to one of packet data unit (PDU) sessions established in the 5GC 110. One or multiple QoS flows may be present in each PDU session. Each DRB may be mapped to one or multiple QoS flows or mapped to none of the QoS flows. Each PDU session may be identified with a PDU session identity (or ID). In addition, each QoS flow may be identified with a QoS flow identity. In addition, an identical QoS may be ensured for data such as IP packets or Ethernet frames passing through an identical QoS flow.

There may be no PDU session and/or QoS flow in the EPC 104. In addition, there may be no EPS bearer in the 5GC 110. Although the UE 122 has information of an EPS bearer in a case that the UE 122 is connected to the EPC 104, the UE 122 may not have information of a PDU session and/or a QoS flow. In addition, although the UE 122 has information of a PDU session and/or a QoS flow in a case that the UE 122 is connected to the 5GC 110, the UE 122 may not have information of an EPS bearer.

Further, in the following description, the eNB 102 and/or the gNB 108 will be simply referred to as a base station apparatus, and the UE 122 will be simply referred to as a terminal apparatus or UE.

Figures 2A, 2B:
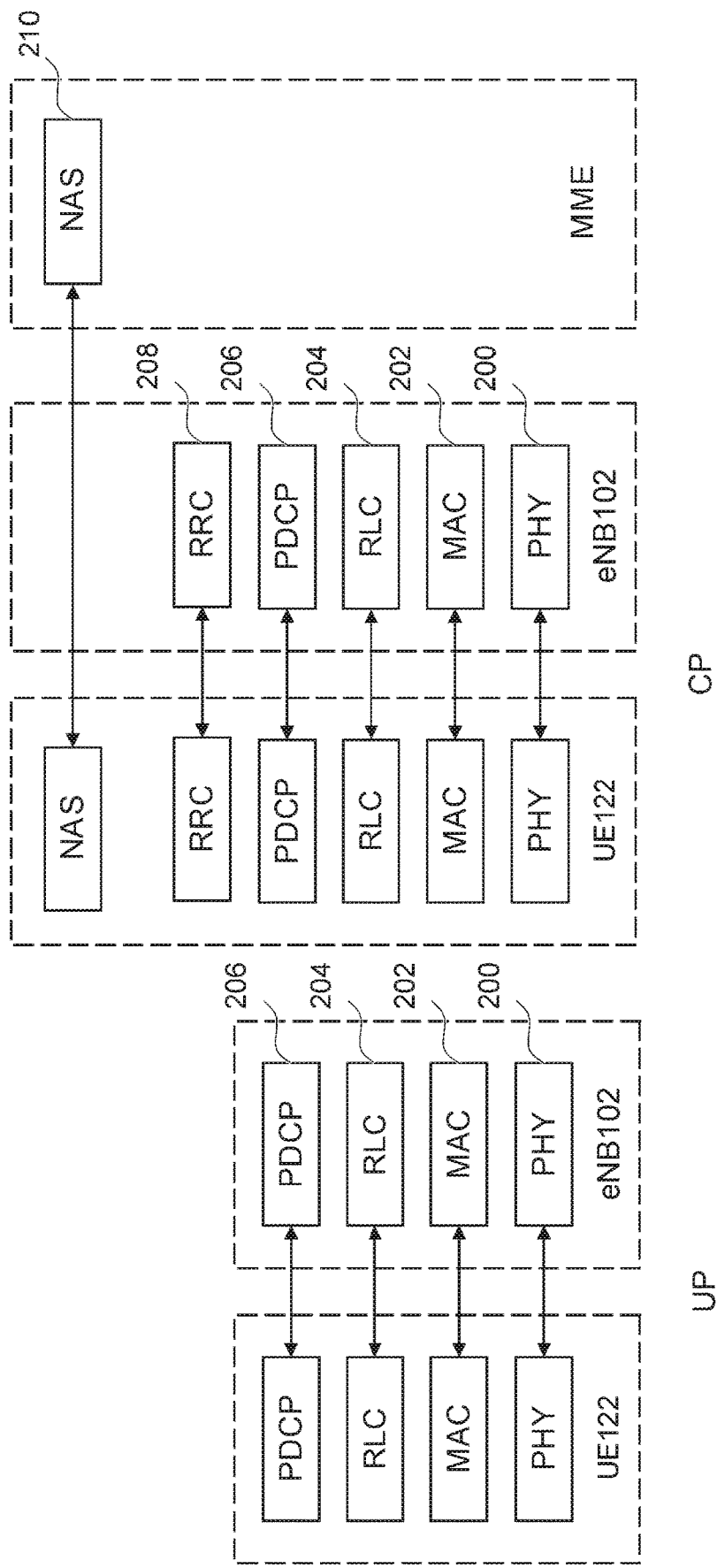
FIGS. 2A-2B are diagrams of an exemplary E-UTRA protocol architecture according to the present embodiment.
Figures 3A, 3B:
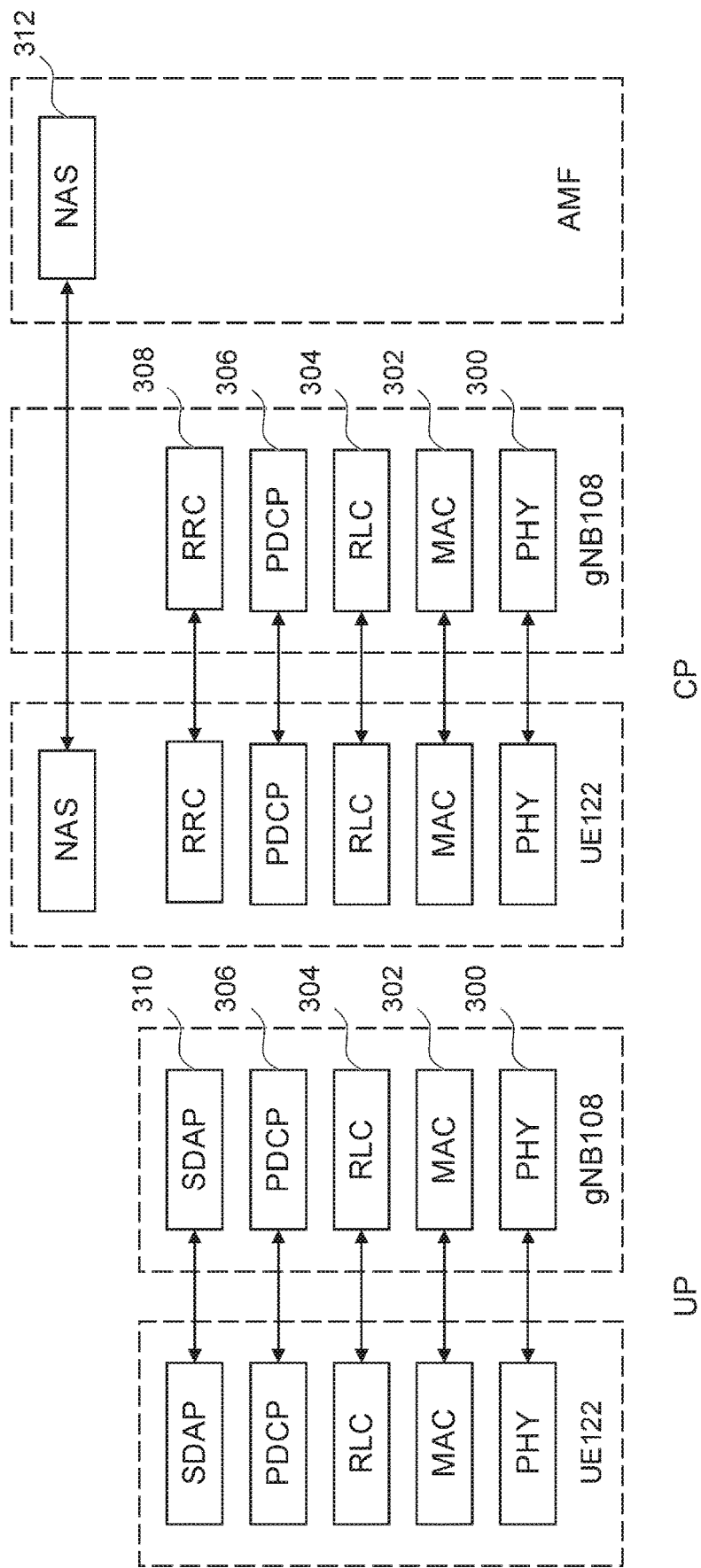
FIGS. 3A-3B are diagrams of an exemplary NR protocol architecture according to the present embodiment.

FIGS. 2A-2B are diagrams of an exemplary E-UTRA protocol architecture according to the present embodiment. In addition, FIGS. 3A-3B are diagrams of an exemplary NR protocol architecture according to the present embodiment. Further, the functions of each protocol described using FIGS. 2A-2B and/or FIGS. 3A-3B are some functions that are closely related to the present embodiment, and may include other functions. Further, in the present embodiment, uplink (UL) may be a link from a terminal apparatus to a base station apparatus. Also in the present embodiment, downlink (DL) may be a link from a base station apparatus to a terminal apparatus.

FIG. 2A is a diagram of an E-UTRA user plane (UP) protocol stack. As illustrated in FIG. 2A, the E-UTRA UP protocol may be a protocol between the UE 122 and the eNB 102. In other words, the E-UTRA UP protocol may be a protocol terminated by the eNB 102 on the network side. As illustrated in FIG. 2A, the E-UTRA user plane protocol stack may include a physical layer (PHY) 200 that is a radio physical layer, a medium access control (MAC) 202 that is a medium access control layer, a radio link control (RLC) 204 that is a radio link control layer, and a packet data convergence protocol (PDCP) 206 that is a packet data convergence protocol layer.

FIG. 3A is a diagram of an NR user plane (UP) protocol stack. As illustrated in FIG. 3A, the NR UP protocol may be a protocol between the UE 122 and the gNB 108. In other words, the NR UP protocol may be a protocol terminated by the gNB 108 on the network side. As illustrated in FIG. 3A, the NR user plane protocol stack may include a PHY 300 that is a radio physical layer, an MAC 302 that is a medium access control layer, an RLC 304 that is a radio link control layer, a PDCP 306 that is a packet data convergence protocol layer, and a service data adaptation protocol (SDAP) 310 that is a service data adaptation protocol layer.

FIG. 2B is a diagram of an E-UTRA control plane (CP) protocol architecture. In the E-UTRA CP protocol, Radio Resource Control (RRC) 208, which is a radio resource control layer, may be a protocol between the UE 122 and the eNB 102 as illustrated in FIG. 2B. In other words, the RRC 208 may be a protocol terminated by the eNB 102 on the network side. In addition, in the E-UTRA CP protocol, Non Access Stratum (NAS) 210, which is a Non Access Stratum (NAS) layer, may be a protocol between the UE 122 and the MME. In other words, the NAS 210 may be a protocol terminated by the MME on the network side.

FIG. 3B is a diagram of the NR control plane (CP) protocol architecture. In the NR CP protocol, the RRC 308, which is a radio resource control layer, may be a protocol between the UE 122 and the gNB 108 as illustrated in FIG. 3B. In other words, the RRC 308 may be a protocol terminated by the gNB 108 on the network side. In addition, in the NR CP protocol, NAS 312, which is a non access stratum layer, may be a protocol between the UE 122 and the AMF. In other words, the NAS 312 may be a protocol terminated by the AMF on the network side.

Further, an Access Stratum (AS) layer may be a layer terminated between the UE 122 and the eNB 102 and/or the gNB 108. In other words, the AS layer may be a layer including some or all of the PHY 200, the MAC 202, the RLC 204, the PDCP 206, and the RRC 208, and/or a layer including some or all of the PHY 300, the MAC 302, the RLC 304, the PDCP 306, the SDAP 310, and the RRC 308.

Further, in the present embodiment, the terms such as PHY (PHY layer), MAC (MAC layer), RLC (RLC layer), PDCP (PDCP layer), RRC (RRC layer), and NAS (NAS layer) may be used without distinguishing the E-UTRAN protocol from the NR protocol below. In such a case, PHY (PHY layer), MAC (MAC layer), RLC (RLC layer), PDCP (PDCP layer), RRC (RRC layer), and NAS (NAS layer) may respectively be the PHY (PHY layer), MAC (MAC layer), RLC (RLC layer), PDCP (PDCP layer), RRC (RRC layer), and NAS (NAS layer) of the E-UTRAN protocol, or may respectively be PHY (PHY layer), MAC (MAC layer), RLC (RLC layer), PDCP (PDCP layer), RRC (RRC layer), and NAS (NAS layer) of the NR protocol. In addition, SDAP (SDAP layer) may be the SDAP (SDAP layer) of the NR protocol.

In addition, in a case that the E-UTRA protocol is distinguished from the NR protocol below in the present embodiment, the PHY 200, the MAC 202, the RLC 204, the PDCP 206, and the RRC 208 may be referred to as PHY for E-UTRA or PHY for LTE, MAC for E-UTRA or MAC for LTE, RLC for E-UTRA or RLC for LTE, PDCP for E-UTRA or PDCP for LTE, and RRC for E-UTRA or RRC for LTE, respectively. In addition, the PHY 200, the MAC 202, the RLC 204, the PDCP 206, and the RRC 208 may be described as E-UTRA PHY or LTE PHY, E-UTRA MAC or LTE MAC, E-UTRA RLC or LTE RLC, E-UTRA PDCP or LTE PDCP, and E-UTRA RRC or LTE RRC, respectively. Furthermore, in the case that the E-UTRA protocol is distinguished from the NR protocol, the PHY 300, the MAC 302, the RLC 304, the PDCP 306, and the RRC 308 may also be referred to as PHY for NR, MAC for NR, RLC for NR, RLC for NR, and RRC for NR, respectively. Furthermore, the PHY 300, the MAC 302, the RLC 304, the PDCP 306, and the RRC 308 may also be described as NR PHY, NR MAC, NR RLC, NR PDCP, and NR RRC, respectively.

An entity of the AS layer of E-UTRA and/or NR will be described. The entity with some or all of the functions of the MAC layer may be referred to as an MAC entity. The entity with some or all of the functions of the RLC layer may be referred to as an RLC entity. The entity with some or all of the functions of the PDCP layer may be referred to as a PDCP entity. The entity with some or all of the functions of the SDAP layer may be referred to as the SDAP entity. The entity with some or all of the functions of the RRC layer may be referred to as an RRC entity. The MAC entity, RLC entity, PDCP entity, SDAP entity, and RRC entity may be referred to as MAC, RLC, PDCP, SDAP, and RRC, respectively.

Further, the data provided from the MAC, RLC, PDCP, and SDAP to a lower layer and/or data provided from a lower layer to the MAC, RLC, PDCP, and SDAP may be referred to as a MAC Protocol Data Unit (PDU), an RLC PDU, a PDCP PDU, and an SDAP PDU, respectively. Further, the data provided from a higher layer to the MAC, RLC, PDCP, and SDAP and/or data provided from the MAC, RLC, PDCP, and SDAP to a higher layer may be referred to as a MAC Service Data Unit (SDU), an RLC SDU, a PDCP SDU, and an SDAP SDU, respectively. In addition, a segmented RLC SDU may be referred to as an RLC SDU segment.

Here, the base station apparatus and the terminal apparatus exchange (transmit and/or receive) signals with (to and/or from) each other in a higher layer. For example, the base station apparatus and the terminal apparatus may transmit and/or receive a Radio Resource Control (RRC) message (also referred to as an RRC message, RRC information, or an RRC signaling) to and/or from each other in an RRC layer. In addition, the base station apparatus and the terminal apparatus may transmit and/or receive a Medium Access Control (MAC) control element to and/or from each other in a MAC layer. In addition, the RRC layer of the terminal apparatus obtains system information broadcast from the base station apparatus. Here, the RRC message, the system information, and/or the MAC control element are also referred to as higher layer signaling or a higher layer parameter. Each of the parameters included in the higher layer signaling received by the terminal apparatus may be referred to as a higher layer parameter. A higher layer in processing by the PHY layer means a higher layer than the PHY layer, and thus may mean one or more layers of the MAC layer, the RRC layer, the RLC layer, the PDCP layer, the Non Access Stratum (NAS) layer, and the like. For example, a higher layer in processing by the MAC layer may mean one or more layers of the RRC layer, the RLC layer, the PDCP layer, the NAS layer, and the like. Hereinafter, "A is given (provided) in a higher layer" or "A is given (provided) by a higher layer" may mean that a higher layer (mainly the RRC layer, the MAC layer, or the like) of the terminal apparatus receives A from the base station apparatus and the received A is given (provided) from the higher layer of the terminal apparatus to the physical layer of the terminal apparatus. For example, "a higher layer parameter is provided" in a terminal apparatus may mean that higher layer signaling is received from the base station apparatus and the higher layer parameter included in the received higher layer signaling is provided to the physical layer of the terminal apparatus from the higher layer of the terminal apparatus. Configuring a higher layer parameter in the terminal apparatus may mean that the higher layer parameter is given (provided) to the terminal apparatus. For example, configuring a higher layer parameter in the terminal apparatus may mean that the terminal apparatus receives higher layer signaling from the base station apparatus and the received higher layer parameter is configured in the higher layer. However, configuring a higher layer parameter in the terminal apparatus may include configuring a pre-given default parameter in the higher layer of the terminal apparatus. To describe transmission of the RRC message from the terminal apparatus to the base station apparatus, the expression that a message is submitted to a lower layer from the RRC entity of the terminal apparatus may be used. "Submitting a message to a lower layer" from the RRC entity of the terminal apparatus may mean submitting a message to the PDCP layer. "Submitting a message to a lower layer" from the RRC layer of the terminal apparatus may mean submitting a message to the PDCP entity corresponding to each SRB because a message of RRC is transmitted using an SRB (SRB0, SRB1, SRB2, SRB3, etc.). In a case that the RRC entity of the terminal apparatus receives an indication from a lower layer, the lower layer may mean one or more layers of the PHY layer, the MAC layer, the RLC layer, the PDCP layer, and the like.

Exemplary functions of PHY will be described. The PHY of the terminal apparatus may have the function of receiving data transmitted from the PHY of the base station apparatus via a downlink (DL) physical channel. The PHY of the terminal apparatus may have the function of transmitting data to the PHY of the base station apparatus via an uplink (UL) physical channel. The PHY may be connected to upper MAC with a transport channel. The PHY may hand over data to the MAC via a transport channel. In addition, the PHY may also provide data from the MAC via the transport channel. A Radio Network Temporary Identifier (RNTI) may be used in the PHY to identify various types of control information.

Now, physical channels will be described. The following physical channels may be included in physical channels used in radio communication between the terminal apparatus and the base station apparatus.

Physical Broadcast Channel (PBCH)
 Physical Downlink Control Channel (PDCCH)
 Physical Downlink Shared Channel (PDSCH)
 Physical Uplink Control Channel (PUCCH)
 Physical Uplink Shared Channel (PUSCH)
 Physical Random Access Channel (PRACH)

The PBCH may be used to broadcast system information required by the terminal apparatuses.

In addition, the PBCH may be used to broadcast time indexes (SSB-Indexes) within the periodicity of synchronization signal blocks (SSBs) in NR.

The PDCCH may be used to transmit (or carry) downlink control information (DCI) in downlink radio communication (radio communication from the base station apparatus to the terminal apparatus). Here, one or multiple pieces of DCI (which may be referred to as DCI formats) may be defined for transmission of downlink control information. In other words, a field for downlink control information may be defined as DCI and mapped to information bits. The PDCCH may be transmitted in a PDCCH candidate. The terminal apparatus may monitor a set of PDCCH candidates in the serving cell. Monitoring a set of PDCCH candidates may mean an attempt to decode the PDCCH in accordance with a certain DCI format. The DCI format may be used for scheduling of the PUSCH in the serving cell. The PUSCH may be used for transmission of user data, transmission of RRC messages, which will be described below, and the like.

The PUCCH may be used to transmit Uplink Control Information (UCI) in uplink radio communication (radio communication from the terminal apparatus to the base station apparatus). Here, the uplink control information may include Channel State Information (CSI) used to indicate a state of a downlink channel. In addition, the uplink control information may include a Scheduling Request (SR) used to request an Uplink Shared Channel (UL-SCH) resource. In addition, the uplink control information may include a Hybrid Automatic Repeat reQuest ACKnowledgement (HARQ-ACK).

The PDSCH may be used to transmit downlink data (Downlink Shared Channel (DL-SCH)) from the MAC layer. Furthermore, in a case of downlink, the PDSCH may also be used to transmit System Information (SI), a Random Access Response (RAR), and the like.

The PUSCH may be used to transmit uplink data (Uplink Shared Channel (UL-SCH)) from the MAC layer or a HARQ-ACK and/or CSI along with the uplink data. In addition, the PUSCH may be used to transmit CSI only or a HARQ-ACK and CSI only. In other words, the PUSCH may be used to transmit UCI only. In addition, the PDSCH or the PUSCH may be used to transmit RRC signaling (also referred to as an RRC message) and a MAC CE. Here, in the PDSCH, the RRC signaling transmitted from the base station apparatus may be signaling common to multiple terminal apparatuses in a cell. In addition, the RRC signaling transmitted from the base station apparatus may be signaling dedicated to a certain terminal apparatus (also referred to as dedicated signaling). In other words, terminal apparatus-specific (UE-specific) information may be transmitted through signaling dedicated to a certain terminal apparatus. In addition, the PUSCH may be used to transmit a capability of UE (UE capability) in uplink.

The PRACH may be used to transmit a random access preamble. The PRACH may be used to indicate an initial connection establishment procedure, a handover procedure, a connection re-establishment procedure, synchronization (timing adjustment) with respect to uplink transmission, and a request for UL-SCH resources.

Exemplary functions of MAC will be described. The MAC may be referred to as a MAC sub-layer. The MAC may have the function of mapping various logical channels to corresponding transport channels. The logical channels may be identified with logical channel identities (Logical Channel IDs). The MAC may be connected to higher RLC with a logical channel. The logical channels may be divided into control channels that transmit control information and traffic channels that transmit user information depending on the types of information to be transmitted. In addition, the logical channels may be divided into uplink logical channels and downlink logical channels. The MAC may have the function of multiplexing MAC SDUs belonging to one or more different logical channels and providing the multiplexing result to the PHY. The MAC may also have the function of demultiplexing MAC PDUs provided from the PHY and providing demultiplexing result to a higher layer via a logical channel to which each MAC SDU belongs. Further, the MAC may have the function of performing error correction through a Hybrid Automatic Repeat reQuest (HARD). In addition, the MAC may have a Scheduling Report (SR) function of reporting scheduling information. The MAC may have the function of priority processing among terminal apparatuses using dynamic scheduling. In addition, the MAC may have the function of priority processing among logical channels in one terminal apparatus. The MAC may have the function of priority processing among overlapping resources in one terminal apparatus. The E-UTRA MAC may have the function of identifying Multimedia Broadcast Multicast Services (MBMSs). In addition, the NR MAC may have the function of identifying Multicast/Broadcast Services (MBSs). The MAC may have the function of selecting a transport format. The MAC may have the function of performing Discontinuous Reception (DRX) and/or Discontinuous Transmission (DTX), the function of performing a Random Access (RA) procedure, the Power Headroom Report (PHR) function of notifying information of transmittable power, and the Buffer Status Report (BSR) function of notifying information of the amount of data in the buffer to be transmitted. The NR MAC may have the Bandwidth Adaptation (BA) function. In addition, a MAC PDU format used in the E-UTRA MAC and a MAC PDU format used in the NR MAC may be different. In addition, the MAC PDU may include a MAC control element (MAC CE) that is an element for performing control in the MAC.

Uplink (UL) and/or downlink (DL) logical channels used in E-UTRA and/or NR will be described.

A Broadcast Control Channel (BCCH) may be a downlink logical channel for broadcasting control information of System Information (SI) or the like.

A Paging Control Channel (PCCH) may be a downlink logical channel for carrying a paging message.

A Common Control Channel (CCCH) may be a logical channel for transmitting control information between a terminal apparatus and a base station apparatus. The CCCH may be used in a case that the terminal apparatus does not have an RRC connection. The CCCH may be used between the base station apparatus and multiple terminal apparatuses.

A Dedicated Control Channel (DCCH) may be a logical channel for performing point-to-point bi-directional transmission of dedicated control information between the terminal apparatus and the base station apparatus. The dedicated control information may be control information dedicated to each terminal apparatus. The DCCH may be used in a case that the terminal apparatus has an RRC connection.

A Dedicated Traffic Channel (DTCH) may be a logical channel for performing point-to-point transmission of user data between the terminal apparatus and the base station apparatus. The DTCH may be a logical channel for transmitting dedicated user data. The dedicated user data may be user data dedicated to each terminal apparatus. The DTCH may exist in both uplink and downlink.

Mapping of a logical channel and a transport channel in uplink in the E-UTRA and/or NR will be described.

The CCCH may be mapped to an Uplink Shared Channel (UL-SCH) which is an uplink transport channel.

A DCCH may be mapped to an Uplink Shared Channel (UL-SCH) which is an uplink transport channel.

The DTCH may be mapped to an Uplink Shared Channel (UL-SCH) which is an uplink transport channel.

Mapping of a logical channel and a transport channel in downlink in the E-UTRA and/or NR will be described.

A BCCH may be mapped to a Broadcast Channel (BCH) and/or a Downlink Shared Channel (DL-SCH) that are downlink transport channels.

The PCCH may be mapped to a Paging Channel (PCH), which is a downlink transport channel.

The CCCH may be mapped to a DownLink Shared Channel (DL-SCH) that is a downlink transport channel.

A DCCH may be mapped to a DownLink Shared Channel (DL-SCH) that is a downlink transport channel.

A DTCH may be mapped to a DownLink Shared Channel (DL-SCH) that is a downlink transport channel.

Exemplary functions of the RLC will be described. The RLC may be referred to as an RLC sub-layer. The E-UTRA RLC may have the function of segmenting (segmentation) and/or concatenating (concatenation) data provided from the PDCP of a higher layer and providing the resultant data to a lower layer. The E-UTRA RLC may have the function of performing reassembly and re-ordering on the data provided from the lower layer and providing the resultant data to the higher layer. The NR RLC may have the function of adding a sequence number independent of a sequence number added by the PDCP to data provided from the PDCP of a higher layer. In addition, the NR RLC may have the function of segmenting (segmentation) data provided from the PDCP and providing the resultant data to a lower layer. In addition, the NR RLC may have the function of performing reassembly on the data provided from the lower layer and providing the resultant data to a higher layer. In addition, the RLC may have a data retransmission function and/or a retransmission request function (Automatic Repeat reQuest or ARQ). In addition, the RLC may have the function of performing error correction using an ARQ. Control information indicating data that has been sent from the reception side to the transmission side of the RLC and needs to be retransmitted to make an ARQ may be called a status report. In addition, a status report transmission indication sent from the transmission side to the reception side of the RLC may be called a poll. In addition, the RLC may have the function of detecting duplication of data. In addition, the RLC may have the function of discarding data. The RLC may have three modes including a Transparent Mode (TM), an Unacknowledged Mode (UM), and an Acknowledged Mode (AM). In the TM, data received from a higher layer may not be segmented, and the RLC header may not be added. A TM RLC entity may be configured to be a uni-directional entity, a transmission TM RLC entity, or a receiving TM RLC entity. Although segmentation and/or concatenation of data received from a higher layer, addition of the RLC header, and the like are performed in the UM, data retransmission control may not be performed. The UM RLC entity may be a uni-directional entity or a bi-directional entity. In a case that the UM RLC entity is a uni-directional entity, the UM RLC entity may be configured to be a transmission UM RLC entity or to be a reception UM RLC entity. In a case that the UM RLC entity is a bi-directional entity, the UM RRC entity may be configured to be a UM RLC entity including a transmitting side and a receiving side. In the AM, segmentation and/or concatenation of data received from a higher layer, the addition of the RLC header, and data retransmission control may be performed. The AM RLC entity may be a bi-directional entity, and may be configured as an AM RLC including a transmitting side and a receiving side. Further, the data provided to the lower layer and/or the data provided from the lower layer in the TM may be referred to as a TMD PDU. In addition, the data provided to the lower layer and/or the data provided from the lower layer in the UM may be referred to as a UMD PDU. In addition, the data provided to the lower layer and/or the data provided from the lower layer in the AM may be referred to as an AMD PDU. An RLC PDU format used in the E-UTRA RLC may be different from an RLC PDU format used in the NR RLC. In addition, the RLC PDU may have an RLC PDU for data and an RLC PDU for control. An RLC PDU for data may be referred to as an RLC Data PDU. In addition, an RLC PDU for control may be referred to as an RLC Control PDU.

Exemplary functions of the PDCP will be described. The PDCP may be referred to as an PDCP sub-layer. The PDCP may have the function of maintaining sequence numbers. In addition, the PDCP may have header compression and decompression functions to efficiently transmit user data such as IP packets or Ethernet frames in radio sections. A protocol used in header compression and decompression of IP packets may be referred to as a Robust Header Combination (ROHC) protocol. In addition, a protocol used in compression and decompression of Ethernet frame headers may be referred to as an Ethernet (trade name) Header Compression (EHC) protocol. In addition, the PDCP may have the function of data encryption and decryption. The PDCP may also have the function of data integrity protection and integrity verification. The PDCP may also have the function of re-ordering. The PDCP may also have the PDCP SDU retransmission function. The PDCP may also have the function of discarding data using a discard timer. The PDCP may also have the function of multiplexing (Duplication). The PDCP may also have the function of discarding repeatedly received data. A PDCP entity may be a bi-directional entity, and may include a transmitting PDCP entity and a receiving PDCP entity. In addition, a PDCP PDU format used in the E-UTRA PDCP and a PDCP PDU format used in the NR PDCP may be different. In addition, the PDCP PDU may have an PDCP PDU for data and an PDCP PDU for control. The PDCP PDU for data may be referred to as a PDCP Data PDU. In addition, the PDCP PDU for control may be referred to as a PDCP CONTROL PDU (PDCP control PDU).

Exemplary functions of the SDAP will be described. The SDAP is a service data adaptive protocol layer. The SDAP may have the function of mapping a downlink QoS flow transmitted from the 5GC 110 to the terminal apparatus via the base station apparatus to a data radio bearer (DRB) and/or mapping an uplink QoS flow transmitted from the terminal apparatus to the 5GC 110 via the base station apparatus to a DRB. The SDAP may also have the function of storing mapping rule information. In addition, the SDAP may have the function of marking a QoS Flow ID (QFI). Further, an SDAP PDU may have an SDAP PDU for data and an SDAP PDU for control. The SDAP PDU for data may be referred to as a SDAP Data PDU. In addition, the SDAP PDU for control may be referred to as an SDAP Control PDU. Further, one SDAP entity of the terminal apparatus may be present for a PDU session.

Exemplary functions of the RRC will be described. The RRC may have the broadcasting (broadcast) function. The RRC may have the calling (Paging) function from the EPC 104 and/or the 5GC 110. The RRC may have the calling (Paging) function from the gNB 108 and/or the eNB 102 connected to the 5GC 110. The RRC may also have an RRC connection management function. The RRC may also have a radio bearer control function. The RRC may also have a cell group control function. The RRC may also have a mobility control function. The RRC may also have a terminal apparatus measurement reporting and terminal apparatus measurement reporting control function. The RRC may also have a QoS management function. The RRC may also have the function of detecting and recovering radio link failure. The RRC may use an RRC message to perform broadcasting, paging, RRC connection management, radio bearer control, cell group control, mobility control, terminal apparatus measurement reporting and terminal apparatus measurement reporting control, QoS management, detection and recovery of radio link failure, and the like. Further, an RRC message and a parameter used in the E-UTRA RRC may be different from an RRC message and a parameter used in the NR RRC.

RRC messages may be sent using a BCCH of a logical channel, may be sent using a PCCH of a logical channel, may be sent using a CCCH of a logical channel, and may be sent using a DCCH of a logical channel. Furthermore, an RRC message sent using a DCCH may be paraphrased as dedicated RRC signaling or RRC signaling.

Examples of an RRC message sent using a BCCH may include, for example, Master Information Block (MIB), each type of System Information Block (SIB), and other RRC messages. Examples of an RRC message sent using a PCCH may include, for example, a paging message, or other RRC messages.

An RRC message transmitted in the uplink (UL) direction using a CCCH may include an RRC setup request message (RRC Setup Request), an RRC resumption request message (RRC Resume Request), an RRC reestablishment request message (RRC Reestablishment Request), an RRC system information request message (RRC System Info Request), and the like. In addition, for example, an RRC connection request message (RRC Connection Request), an RRC connection resumption request message (RRC Connection Resume Request), an RRC connection reestablishment request message (RRC Connection Reestablishment Request), and the like may be included. In addition, other RRC messages may be included.

Examples of RRC message sent in the downlink (DL) direction using a CCCH may include, for example, an RRC connection rejection message (RRC Connection Reject), an RRC connection setup message (RRC Connection Setup), an RRC connection reestablishment message (RRC Connection Reestablishment), an RRC connection reestablishment rejection message (RRC Connection Reestablishment Reject), and the like. In addition, for example, an RRC reject message (RRC Reject), an RRC setup message (RRC Setup), and the like may be included. In addition, other RRC messages may be included.

Examples of RRC signaling transmitted in the uplink (UL) direction using a DCCH may include, for example, a measurement report message (Measurement Report), an RRC connection reconfiguration completion message (RRC Connection Reconfiguration Complete), an RRC connection setup completion message (RRC Connection Setup Complete), an RRC connection reestablishment completion message (RRC Connection Reestablishment Complete), a security mode completion message (Security Mode Complete), a UE capability information message (UE Capability Information), and the like. Furthermore, for example, a measurement report message (Measurement Report), an RRC reconfiguration complete message (RRC Reconfiguration Complete), an RRC setup complete message (RRC Setup Complete), an RRC reestablishment complete message (RRC Reestablishment Complete), an RRC resumption complete message (RRC Resume Complete), a security mode complete message (Security Mode Complete), a UE capability information message (UE Capability Information), and the like may be included. In addition, other RRC signaling may be included.

Examples of RRC signaling sent in the downlink (DL) direction using a DCCH may include, for example, an RRC connection reconfiguration message (RRC Connection Reconfiguration), an RRC connection release message (RRC Connection Release), a security mode command message (Security Mode Command), a UE capability enquiry message (UE Capability Enquiry), and the like. Furthermore, for example, an RRC reconfiguration message (RRC Reconfiguration), an RRC resume message (RRC Resume), an RRC release message (RRC Release), an RRC reestablishment message (RRC Reestablishment), a security mode command message (Security Mode Command), a UE capability enquiry message (UE Capability Enquiry), and the like may be included. In addition, other RRC signaling may be included.

Exemplary functions of the NAS will be described. The NAS may have an authentication function. In addition, the NAS may have the function of managing mobility. In addition, the NAS may have a security control function.

The above-described functions of the PHY, the MAC, the RLC, the PDCP, the SDAP, the RRC, and the NAS are examples, and some or all of the functions may not be implemented. In addition, some or all of the functions of each layer may be included in another layer.

Next, a state transition of the UE 122 in LTE and NR will now be described. The UE 122 connected to the EPC or 5GC may be in an RRC_CONNECTED state in a case that an RRC connection has been established. The state in which an RRC connection has been established may include a state in which the UE 122 holds some or all of a UE context described below. In addition, the state in which an RRC connection has been established may include a state in which the UE 122 can transmit and/or receive unicast data. In addition, the UE 122 may be in an RRC_INACTIVE state in a case that an RRC connection is halted (suspended). Furthermore, the UE 122 being in the RRC_INACTIVE state may be a case in which the UE 122 is being connected to the 5GC and the RRC connection is being suspended. The UE 122 may be in an RRC_IDLE state in a case that the UE 122 is neither in the RRC_CONNECTED state nor the RRC_INACTIVE state.

Further, although the UE 122 does not hold the RRC_INACTIVE state in a case of being connected to the EPC, the E-UTRAN may start suspension of the RRC connection. In a case that the UE 122 is being connected to the EPC and the RRC connection is being suspended, the UE 122 may transition to the RRC_IDLE state while retaining an AS context of the UE and an identity used for resumption (resumeIdentity). A higher layer (e.g., NAS layer) of the RRC layer of the UE 122 may start resumption of the suspended RRC connection in a case that the UE 122 retains the AS context of the UE, the E-UTRAN has permitted the RRC connection to be resumed, and the UE 122 needs to transition from the RRC_IDLE state to the RRC_CONNECTED state.

The definition of suspension may vary between the UE 122 connected to the EPC 104 and the UE 122 connected to the 5GC 110. In addition, all or part of the procedure for the UE 122 from suspension to resumption of the RRC connection may vary between a case in which the UE 122 is connected to the EPC (the UE 122 is suspended in the RRC_IDLE state) and a case in which the UE 122 is connected to the 5GC (the UE 122 is suspended in the RRC_INACTIVE state).

Further, the RRC_CONNECTED state, the RRC_INACTIVE state, and the RRC_IDLE state may be respectively referred to as a connected state (connected mode), a deactivated state (inactive mode), and an idle state (idle mode), and referred to as an RRC connected state (RRC connected mode), an RRC deactivated state (RRC inactive mode), and an RRC idle state (RRC idle mode).

Next, a serving cell will be described. For the terminal apparatus in the RRC connected state without CA and/or DC configuration, which will be described below, a serving cell may include one primary cell (PCell). In addition, for the terminal apparatus in the RRC connected state with CA and/or DC configuration, which will be described below, multiple serving cells may mean a set of multiple cells (set of cell(s)) including one or more special cells (SpCells) and one or more all secondary cells (SCells). An SpCell may support PUCCH transmission and contention-based random access (CBRA). Additionally or alternatively, in a case that deactivation of a secondary cell group (SCG) to be described below is not supported or an SCG is not deactivated (i.e., in a case that an SCG is activated), the SpCell of the SCG may always be activated. Additionally or alternatively, the SpCell may be a cell added or modified by a synchronized reconfiguration information element to be described below. A PCell may be a cell used in an RRC connection establishment procedure when the terminal apparatus in the RRC idle state transitions to an RRC connected state. In addition, a PCell may be a cell used in an RRC connection reestablishment procedure in which the terminal apparatus reestablishes an RRC connection. In addition, a PCell may be a cell used in a random access procedure at the time of a handover. In addition, a SpCell may be a cell used for applications other than the applications described above.

A group of serving cells, configured for the terminal apparatus, that includes an SpCell and one or more SCells may be considered to be carrier aggregation (CA) being configured for the terminal apparatus. Furthermore, a cell that provides additional radio resources for an SpCell to the terminal apparatus configured with CA may mean an SCell.

Among groups of serving cells configured with RRC, a group of serving cells using the same timing reference cell as a cell for which uplink is configured and the same value of timing advance may be referred to as a timing advance group (TAG). In addition, a TAG including an SpCell of an MAC entity may mean a Primary Timing Advance Group (PTAG). In addition, TAGs other than the above-described PTAG may mean a Secondary Timing Advance Group (STAG). Further, one or more of the TAGs may be configured for each cell group described below.

A cell group configured from the base station apparatus for the terminal apparatus will be described. A cell group may include one SpCell. In addition, a cell group may include one SpCell and one or more SCells. In other words, a cell group may include one SpCell, and one or more SCells depending on the necessity (optionally). Further, a cell group may be expressed as a set of cells.

Dual Connectivity (DC) may be a technique of performing data communication by utilizing radio resources of a cell group including a first base station apparatus (a first node) and a cell group including a second base station apparatus (a second node). In a case that DC or MR-DC described below is performed, a cell group may be added for the terminal apparatus by a base station apparatus. To perform DC, the first base station apparatus may add the second base station apparatus. The first base station apparatus may be referred to as a master node (MN). Also, a cell group including a master node may be referred to as a master cell group (MCG). The second base station apparatus may be referred to as a secondary node (SN). In addition, a cell group including a secondary node may be referred to as a secondary cell group (SCG). Further, the master node and the secondary node may be included in the same base station apparatus.

In addition, in a case that DC is not configured, a cell group configured for the terminal apparatus may be referred to as an MCG. In addition, in a case that DC is not configured, a SpCell configured for the terminal apparatus may be a PCell.

Further, Multi-Radio Dual Connectivity (MR-DC) may be a technique of performing DC using E-UTRA in an MCG and using NR in an SCG. In addition, MR-DC may be a technique of performing DC using NR in an MCG and using E-UTRA in an SCG. Furthermore, MR-DC may be a technique of performing DC using NR in both an MCG and an SCG. MR-DC may be a technique included in DC. Examples of MR-DC in which E-UTRA is used in an MCG and NR is used in an SCG may include E-UTRA-NR Dual Connectivity (EN-DC) using EPC for a core network, and NG-RAN E-UTRA-NR Dual Connectivity (NGEN-DC) using a 5GC for a core network. Furthermore, examples of MR-DC in which NR is used in an MCG and E-UTRA is used in an SCG may include NR-E-UTRA Dual Connectivity (NE-DC) using a 5GC for a core network. In addition, examples of MR-DC in which NR is used in both an MCG and an SCG may include NR-NR Dual Connectivity (NR-DC) using a 5GC for a core network.

Further, the terminal apparatus may have one MAC entity for each cell group. For example, in a case that DC or MR-DC is configured for the terminal apparatus, there may be one MAC entity for an MCG, and one MAC entity for an SCG. The MAC entity for an MCG in the terminal apparatus may always be established for the terminal apparatus in any state (the RRC idle state, the RRC connected state, the RRC deactivated state, or the like). In addition, the MAC entity for an SCG in the terminal apparatus may be created by the terminal apparatus in a case that the SCG is configured for the terminal apparatus. In addition, the MAC entity for each cell group of the terminal apparatus may be configured by the terminal apparatus receiving RRC signaling from the base station apparatus. In a case that the MAC entity is associated with an MCG, an SpCell may mean a PCell. In addition, in a case that the MAC entity is associated with an SCG, an SpCell may mean a primary SCG cell (PSCell). In addition, in a case that the MAC entity is not associated with a cell group, an SpCell may mean a PCell. The PCell, PSCell, and SCell are serving cells. In EN-DC and NGEN-DC, the MAC entity for an MCG may be an E-UTRA MAC entity, and the MAC entity for an SCG may be an NR MAC entity. Furthermore, in NE-DC, the MAC entity for an MCG may be an NR MAC entity, and the MAC entity for an SCG may be an E-UTRA MAC entity. In addition, in NR-DC, the MAC entities for an MCG and an SCG may both be NR MAC entities. Further, one MAC entity being present for each cell group may be paraphrased that one MAC entity is present for each SpCell. Furthermore, one MAC entity for each cell group may be paraphrased as one MAC entity for each SpCell.

A radio bearer will be described. In a case that the terminal apparatus communicates with the base station apparatus, a radio bearer (RB) may be established between the terminal apparatus and the base station apparatus to perform a radio connection. A radio bearer used in CP may be referred to as a signaling radio bearer (SRB). In addition, a radio bearer used in UP may be referred to as a data radio bearer (DRB). A radio bearer identity (ID) may be assigned to each radio bearer. A radio bearer identity for an SRB may be referred to as an SRB identity (SRB ID). A radio bearer identity for a DRB may be referred to as a DRB identity (DRB ID). SRB0 to SRB2 may be defined for SRB of E-UTRA, and other SRBs may be defined. SRB0 to SRB3 may be defined for SRB of NR, and other SRBs may be defined. The SRB0 may be an SRB for an RRC message, which is transmitted and/or received using the logical channel CCCH. The SRB1 may be an SRB for RRC signaling and for NAS signaling prior to the establishment of the SRB2. The RRC signaling to be transmitted and/or received using the SRB1 may include piggybacked NAS signaling. The logical channel DCCH may be used for all RRC signaling and NAS signaling transmitted and/or received using the SRB1. The SRB2 may be an SRB for a NAS signaling and RRC signaling including logged measurement information. The logical channel DCCH may be used for all RRC signaling and NAS signaling transmitted and/or received using the SRB2. In addition, the SRB2 may have a lower priority than SRB1. The SRB3 may be an SRB for transmitting and/or receiving specific RRC signaling in a case that the terminal apparatus is configured with EN-DC, NGEN-DC, NR-DC, and the like. The logical channel DCCH may be used for all RRC signaling and NAS signaling transmitted and/or received using the SRB3. Other SRBs may also be provided for other applications. A DRB may be a radio bearer for user data. The logical channel DTCH may be used for RRC signaling transmitted and/or received using a DRB.

A radio bearer of the terminal apparatus will be described. A radio bearer may include an RLC bearer. The RLC bearer may include one or two RLC entities and a logical channel. In the case that there are two RLC entities in the RLC bearer, the RLC entities may be a transmission RLC entity and a reception RLC entity in a TM RLC entity and/or a uni-directional UM mode RLC entity. The SRB0 may include one RLC bearer. The RLC bearer of the SRB0 may be include a TM RLC entity and a logical channel. The SRB0 may always be established in a terminal apparatus in any state (the RRC idle state, the RRC connected state, the RRC deactivated state, or the like). One SRB1 may be established and/or configured for the terminal apparatus by RRC signaling received from the base station apparatus in a case that the terminal apparatus transitions from the RRC idle state to the RRC connected state. The SRB1 may include one PDCP entity and one or more RLC bearers. The RLC bearers of the SRB1 may include an AM RLC entity and a logical channel. One SRB2 may be established and/or configured for the terminal apparatus by the RRC signaling from the base station apparatus, the RRC signaling being received by the terminal apparatus in the RRC connected state in which AS security has been activated. The SRB2 may include one PDCP entity and one or more RLC bearers. The RLC bearers of the SRB2 may include an AM RLC entity and a logical channel. Further, the PDCP of the SRB1 and SRB2 on the base station apparatus side may be allocated on a master node. In a case that a secondary node is added in EN-DC, NGEN-DC, or NR-DC, or in a case that a secondary node is changed, one SRB3 may be established and/or configured in the terminal apparatus by the RRC signaling from the base station apparatus, the RRC signaling being received by the terminal apparatus in the RRC connected state in which AS security has been activated. The SRB3 may be a direct SRB between the terminal apparatus and the secondary node. The SRB3 may include one PDCP entity and one or more RLC bearers. The RLC bearers of the SRB3 may include an AM RLC entity and a logical channel. The PDCP of the SRB3 on the base station apparatus side may be allocated on the secondary node. One or more DRBs may be established and/or configured for the terminal apparatus by the RRC signaling from the base station apparatus, the RRC signaling being received by the terminal apparatus in the RRC connected state in which AS security has been activated. The DRBs may include one PDCP entity and one or more RLC bearers. The RLC bearers of the DRBs may include a UM RLC entity and a logical channel.

Further, in MR-DC, a radio bearer in which the PDCP is allocated on the master node may be referred to as an MN terminated bearer. In addition, in MR-DC, a radio bearer in which the PDCP is allocated on the secondary node may be referred to as an SN terminated bearer. Further, in MR-DC, a radio bearer in which an RLC bearer is present only in an MCG may be referred to as an MCG bearer. Further, in MR-DC, a radio bearer in which an RLC bearer is present only in an SCG may be referred to as an SCG bearer. In addition, in DC, a radio bearer in which RLC bearers are present in both an MCG and an SCG may be referred to as a split bearer.

In a case that MR-DC is configured for the terminal apparatus, the bearer types of the SRB1 and the SRB2 established and/or configured in the terminal apparatus may be the MN-terminated MCG bearer and/or MN-terminated split bearer. In addition, in a case that MR-DC is configured for the terminal apparatus, the bearer type of SRB3 that is established and/or configured in the terminal apparatus may be an SN-terminated SCG bearer. In addition, in a case that MR-DC is configured for the terminal apparatus, the bearer type of the DRB that is established and/or configured in the terminal apparatus may be any of all bearer types.

An RLC entity established and/or configured for an RLC bearer established and/or configured in a cell group configured with E-UTRA may be an E-UTRA RLC. In addition, an RLC entity established and/or configured for an RLC bearer established and/or configured in a cell group configured with NR may be an NR RLC. In a case that EN-DC is configured for the terminal apparatus, a PDCP entity established and/or configured in an MN-terminated MCG bearer may be either E-UTRA PDCP or NR PDCP. In addition, in a case that EN-DC is configured for the terminal apparatus, a PDCP established and/or configured for a radio bearer of other bearer types, namely an MN-terminated split bearer, an MN-terminated SCG bearer, an SN-terminated MCG bearer, an SN-terminated split bearer, and an SN-terminated SCG bearer may be NR PDCP. In addition, in a case that NGEN-DC, NE-DC, or NR-DC is configured for the terminal apparatus, a PDCP entity established and/or configured for radio bearers of all bear types may be the NR PDCP.

Further, in NR, a DRB established and/or configured in the terminal apparatus may be linked to one PDU session. One SDAP entity may be established and/or configured for one PDU session for the terminal apparatus. The establishment and/or configuration SDAP entity, PDCP entity, RLC entity, and logical channel for the terminal apparatus may be established and/or configured by RRC signaling received by the terminal apparatus from the base station apparatus.

Further, a network configuration in which the eNB 102 is used as a master node and the EPC 104 is used as a core network regardless of whether MR-DC is configured may be referred to as E-UTRA/EPC. Additionally, a network configuration in which the eNB 102 is used as a master node and the 5GC 110 is used as a core network may be referred to as E-UTRA/5GC. In addition, a network configuration in which the gNB 108 is used as a master node and the 5GC 110 is used as a core network may be referred to as NR or NR/5GC. The above-described master node without MR-DC configuration may refer to a base station apparatus that communicates with the terminal apparatus.

Next, a handover in LTE and NR will now be described. A handover may be processing of the UE 122 in the RRC connected state to change a serving cell from a source SpCell to a target SpCell. A handover may be performed in a case that the UE 122 receives RRC signaling indicating a handover from the eNB 102 and/or the gNB 108. The RRC signaling indicating the handover may be a message related to a reconfiguration of an RRC connection including a parameter indicating a handover (e.g., an information element named MobilityControlInfo, or an information element named ReconfigurationWithSync). Further, the information element named MobilityControlInfo described above may be paraphrased as mobility control configuration information element, mobility control configuration, or mobility control information. Further, the information element named ReconfigurationWithSync described above may be paraphrased as synchronized reconfiguration information element, or synchronized reconfiguration. In addition, the RRC signaling indicating the handover may be a message indicating movement of other RAT to a cell (e.g., MobilityFromEUTRACommand, or MobilityFromNRCommand). In addition, the handover may also be paraphrased as reconfiguration with synchronization (reconfiguration with sync). In addition, conditions that allow the UE 122 to perform a handover may include some or all of a case in which AS security is activated, a case in which the SRB2 is established, and a case in which at least one DRB is established.

Next, PSCell change and PSCell addition in LTE and NR will be described. The PSCell change may be a process of changing a secondary node that performs data communication with the UE 122 configured with DC from a source secondary node to a target secondary node. The PSCell addition may be a process of newly adding a secondary node that performs data communication with the UE 122 configured with DC. The PSCell change and PSCell addition may mean secondary node change and secondary node addition, respectively. The PSCell change may be performed in a case that the UE 122 receives RRC signaling to indicate PSCell change from the master node. The PSCell addition may be performed in a case that the UE 122 receives RRC signaling to indicate PSCell addition from the master node. Further, the above-described master node may be the eNB 102 and/or the gNB 108. The RRC signaling indicating the PSCell change may be a message, related to an RRC connection reconfiguration, that includes a parameter indicating the PSCell change (e.g., an information element named MobilityControlInfoSCG or an information element named ReconfigurationWithSync). In addition, the RRC signaling indicating the PSCell addition may be a message, related to an RRC connection reconfiguration, that includes a parameter indicating the PSCell addition (e.g., an information element named MobilityControlInfoSCG or an information element named ReconfigurationWithSync). Further, the information element named MobilityControlInfoSCG described above may be paraphrased as mobility control configuration information element of the SCG, mobility control configuration of the SCG, or mobility control information of the SCG. Further, the information element named ReconfigurationWithSync described above may be paraphrased as synchronized reconfiguration information element, or synchronized reconfiguration. Also in MR-DC, the PSCell change and/or PSCell addition need not always require security key updates.

Conditional handover (CHO) will be described. The conditional handover may be a handover performed only in a case that one or more execution conditions are met. In a case that a CHO configuration is received, the terminal apparatus starts evaluation of one or more execution conditions, and once a handover is performed, the terminal apparatus stops the evaluation.

Here, the CHO configuration may include a configuration of one or more CHO candidate cells generated by one or more candidate gNBs, and one or more execution conditions generated by a source gNB for one CHO candidate cell. One execution condition may include one or more trigger conditions. In evaluation of the execution condition for one candidate cell, only one RS type is supported, and a maximum of two different trigger quantities may be simultaneously configured. The two different trigger quantities may be, for example, RSRP and RSRQ, may be RSRP and SINR, or may be a combination of other indications.

In a case that the terminal apparatus receives signaling without a CHO configuration indicating a handover before at least one execution condition is satisfied, the terminal apparatus may perform a process of handover which is different from CHO regardless of the previously received CHO configuration. In addition, while the CHO is being performed, that is, after the terminal apparatus starts synchronization with the target cell, the terminal apparatus may not monitor the source cell.

Conditional PSCell addition (CPA) will be described. The conditional PSCell addition may be PSCell addition to be performed only in a case that one or more execution conditions are met. In a case that the terminal apparatus receives a CPA configuration, the terminal apparatus may start evaluation of one or more execution conditions, and once PSCell addition is performed, the terminal apparatus may stop the evaluation.

Here, the CPA configuration may include a configuration of one or more CPA candidate cells (CPA candidate PSCells) and one or more execution conditions for one CPA candidate cell. One execution condition may include one or two trigger conditions. In evaluation of the execution condition of one candidate cell, only one RS type is supported, and a maximum of two different trigger quantities may be simultaneously configured. The two different trigger quantities may be, for example, RSRP and RSRQ, may be RSRP and SINR, or may be a combination of other indications.

Conditional PSCell change (CPC) will be described. The conditional PSCell change may be PSCell change performed only in a case that one or more execution conditions are met. In a case that the terminal apparatus receives a CPC configuration, the terminal apparatus may start evaluation of one or more execution conditions, and once PSCell change is performed, the terminal apparatus may stop the evaluation.

Here, the CPC configuration may include a configuration of one or more CPC candidate cells (CPC candidate PSCells) and one or more execution conditions for one candidate cell. In addition, the CPC configuration may include a configuration of the master node for CPC with respect to secondary nodes. One execution condition may include one or two trigger conditions. In evaluation of the execution condition of one candidate cell, only one RS type is supported, and a maximum of two different trigger quantities may be simultaneously configured. The two different trigger quantities may be, for example, RSRP and RSRQ, may be RSRP and SINR, or may be a combination of other indications.

The RS type in the above description may be a reference signal (RS) used for the terminal apparatus to acquire measurement results of a beam and a cell. In addition, the RS type may be used to evaluate execution conditions in a conditional reconfiguration. In addition, the RS type may be included in a reporting configuration (Reporting Configuration) in measurement.

Next, a conditional reconfiguration in NR will be described. A conditional reconfiguration may be conditional handover, conditional PSCell addition, and/or conditional PSCell change. A network configures one or more target candidate cells with a conditional reconfiguration for the terminal apparatus. The terminal apparatus evaluates the state of the configured candidate cell. The terminal apparatus performs the evaluation to apply a conditional reconfiguration information element associated with a candidate cell satisfying the execution condition. In addition, the terminal apparatus may hold a list of entries to be described below (VarConditonalReconfig) for a conditional reconfiguration.

In a case that the information related to the conditional reconfiguration includes an entry deletion list (condReconfigToRemoveList) based on the fact that the information related to the conditional reconfiguration has been received, the terminal apparatus may perform an operation of erasing a target candidate cell of the conditional reconfiguration, and in a case that the information related to the conditional reconfiguration includes an entry addition/modification list (condReconfigToAddModList), the terminal apparatus may perform an operation of adding or modifying a target candidate cell of the conditional reconfiguration.

The operation of erasing a target candidate cell of the conditional reconfiguration may be an operation in which, in a case that the identity of an entry (condReconfigId) included in the entry deletion list is included in the list of entries held by the terminal apparatus, the terminal apparatus erases the entry corresponding to the identity of the entry from the list of entries held by the terminal apparatus. Further, in the following description, the list of entries held by the terminal apparatus is also referred to simply as an entry list. That is, an "entry list" described below refers to a list of entries held by the terminal apparatus unless specified otherwise. Furthermore, the entry list may be a variable named VarConditionalReconfig. In addition, the identity of an entry is also referred to simply as an entry identity.

The operation of adding or modifying a target candidate cell with the conditional reconfiguration may be that the terminal apparatus performs the following processing (A) and/or processing (B) in a case that each entry identity included in the entry addition/modification list is present in an entry on the entry list.

(A) In a case that an entry included in the entry addition/modification list includes an execution condition (condExecutionCond), the execution condition for the entry on the entry list that matches the entry identity of the entry is replaced with the execution condition included in the entry addition/modification list.

(B) In a case that an entry included in the entry addition/modification list includes a conditional reconfiguration information element (condRRCReconfig), a conditional reconfiguration information element of the entry list that matches the entry identity of the entry is replaced with a conditional reconfiguration information element included in the entry addition/modification list.

In addition, in a case that the entry identity included in the entry addition/modification list is not included in the entry list, the terminal apparatus may add a new entry corresponding to the entry identity not included in the entry list to the entry list.

Further, an entry deletion list may be a list of configurations of one or more candidate SpCells to be deleted. The entry addition/modification list may be a list of configurations of one or more candidate SpCells that are to be added and modified for CHO, CPC and CPA. Each entry included in the entry addition/modification list may include an entry identity, and may additionally include an execution condition and/or a conditional reconfiguration information element. Each entry may be associated with one candidate SpCell of one or more candidate SpCells. The entry identity is an identity used to identify each entry of CHO, CPA and CPC. The entry list may include one or more entries. Each entry may include one entry identity, one or more execution conditions, and one conditional reconfiguration information element. In a case that an entry list includes no entries, the terminal apparatus may hold an empty list. The execution conditions may be conditions that need to be satisfied to trigger performance of the conditional reconfiguration. The conditional reconfiguration information element may be a reconfiguration message for the RRC connection applied when the execution conditions are satisfied. The RRC connection reconfiguration message may be a message used to connect to a candidate SpCell. The conditional reconfiguration information element may include a synchronized reconfiguration information element.

The terminal apparatus may evaluate execution conditions of entries included in an entry list. In a case that an entry list is empty or no entry list is held, the terminal apparatus may not evaluate the execution conditions.

Performing a conditional reconfiguration may be performance in which, in a case that one or more execution conditions are satisfied, a conditional reconfiguration information element included in the same entry as that of the one or more execution conditions is applied and a reconfiguration of the RRC connection based on the conditional reconfiguration information element is performed.

In a case that there is a plurality of candidate cells satisfying the execution condition, the terminal apparatus may select one cell from among the plurality of candidate cells satisfying the execution condition, and apply the conditional reconfiguration information element associated with the selected candidate cell.

Deactivation of a secondary cell group (SCG) will be described. A network may activate and deactivate a secondary cell group (SCG) configured for the terminal apparatus. In addition, the terminal apparatus may receive indication to activate or deactivate the SCG by the network.

The terminal apparatus receiving indication to deactivate the SCG may deactivate the SCG by performing some or all of the following processes (A) to (F) for the PSCell of the SCG in the RRC connected state.

(A) not transmit SRS on the PSCell.
(B) not report CSI for the PSCell.
(C) not transmit UL-SCH on the PSCell.
(D) not transmit PUCCH on the PSCell.
(E) not monitor PDCCH on the PSCell.
(F) not monitor PDCCH for the PSCell.

The terminal apparatus receiving indication to activate the SCG may activate the SCG by performing some or all of the following processes (A) to (D) for the PSCell of the SCG in the RRC connected state.

(A) SRS transmissions on the PSCell.
(B) CSI reporting for the PSCell.
(C) PDCCH monitoring on the PSCell.
(D) PUCCH transmissions on the PSCell.

Figure 4:
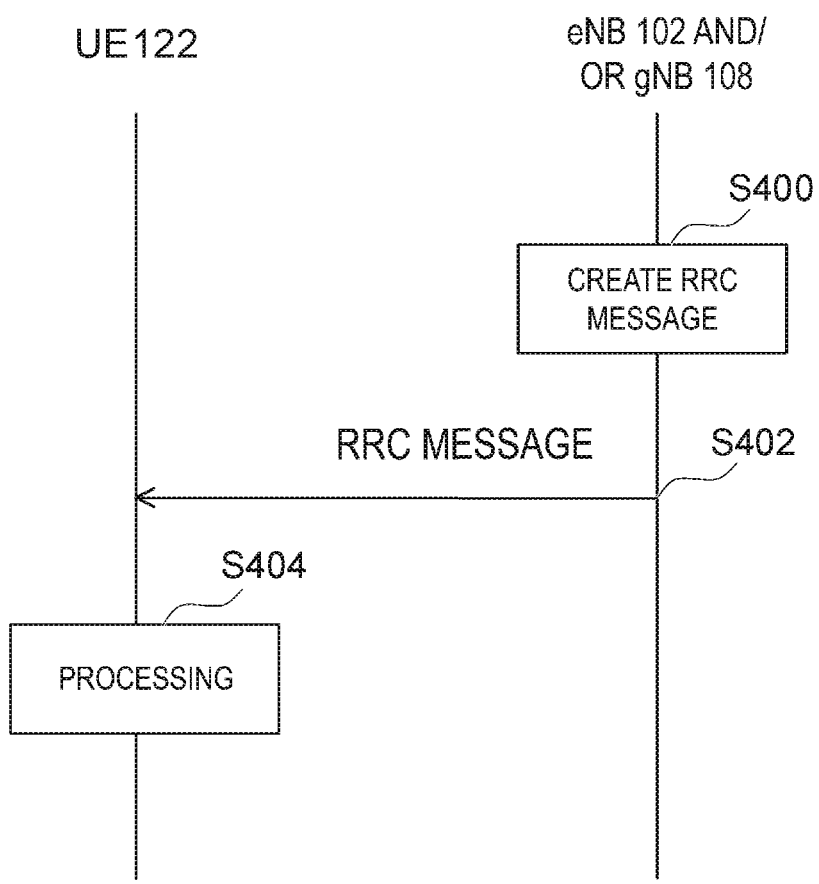
FIG. 4 is a diagram illustrating an exemplary flow of a procedure for various configurations in RRC according to the present embodiment.

The flow of RRC signaling transmitted and/or received to and/or from the terminal apparatus and the base station apparatus will be described. FIG. 4 is a diagram illustrating an exemplary flow of a procedure for various configurations in RRC according to the present embodiment. FIG. 4 is an exemplary flow of a case in which RRC signaling is sent from the base station apparatus (eNB 102 and/or gNB 108) to the terminal apparatus (UE 122).

In FIG. 4, the base station apparatus creates an RRC message (step S400). Creation of an RRC message by the base station apparatus may be performed to deliver system information (SI) or a paging message by the base station apparatus. Furthermore, the creation of an RRC message by the base station apparatus may be performed to transmit RRC signaling by base station apparatus to cause a specific terminal apparatus to perform a process. Examples of the process to be performed by a specific terminal apparatus may include a process of security-related configuration, reconfiguration of RRC connection, a handover to a different RAT, suspension of RRC connection, and release of RRC connection. Examples of the process of reconfiguration of RRC connection may include a process of control of radio bearers (establishment, change, release, and the like), control of cell groups (establishment, addition, change, release, and the like), measurement configuration, handover, and security key updates. Furthermore, the creation of an RRC message by the base station apparatus may be performed in order to respond to RRC signaling transmitted from the terminal apparatus. Examples of the response to the RRC signaling transmitted from the terminal apparatus may include a response to an RRC setup request, a response to an RRC reconnection request, and a response to an RRC resume request. The RRC message includes information (parameters) for various information notifications and configurations. These parameters may be referred to as fields and/or information elements, and may be described using a description method called Abstract Syntax Notation One (ASN.1).

In FIG. 4, the base station apparatus then transmits the created RRC signaling to the terminal apparatus (step S402). Then, in a case that a process such as configuration is necessary in accordance with the received RRC signaling, the terminal apparatus performs the process (step S404). The terminal apparatus that has performed process may transmit to the base station apparatus RRC signaling as a response (not illustrated).

RRC signaling may be used not only in the above examples but also for other purposes.

Further, in MR-DC, RRC of the master node side may be used in order to transfer RRC signaling to and/or from the terminal apparatus, the RRC signaling being used for configuration (cell group configuration, radio bearer configuration, measurement configuration, and the like) on an SCG side. For example, in EN-DC or NGEN-DC, RRC signaling of E-UTRA transmitted and/or received to and/or from each other between the eNB 102 and the UE 122 may include, in the form of a container, RRC signaling of NR. Furthermore, in NE-DC, RRC signaling of NR transmitted and/or received to and/or from each other between the gNB 108 and the UE 122 may include, in the form of a container, RRC signaling of E-UTRA. The RRC signaling for configuration on the SCG side may be transmitted and/or received to and/or from each other between the master node and the secondary node.

Further, the embodiment is not limited to use of MR-DC, and RRC signaling for E-UTRA transmitted from the eNB 102 to the UE 122 may include RRC signaling for NR, and RRC signaling for NR transmitted from the gNB 108 to the UE 122 may include RRC signaling for E-UTRA.

Exemplary parameters included in a message related to reconfiguration of an RRC connection will be described. FIG. 7 illustrates an exemplary description of ASN.1 included in a message regarding an RRC connection reconfiguration in NR in FIG. 4, the description indicating a field for cell group configuration and/or information elements. The terms "omitted" and "partly omitted" in the example of ASN.1 in the present embodiment indicate omission of other information, rather than omission of a part of the notation of ASN.1, without being limited to FIG. 7. Further, there may also be omitted information elements in a part where neither <omitted> nor <partly omitted> is indicated. Further, in the present embodiment, the example of ASN.1 does not follow the ASN.1 notation method correctly. The example of ASN.1 in the present embodiment represents the notation of an example of parameters of RRC signaling of the present embodiment, and other names and notation may be used. In addition, the example of ASN.1 represents only examples related to main information closely associated with the present embodiment in order to avoid complicated description. Further, the parameters notated in ASN.1 may all be referred to as information elements without distinction between fields, information elements, or the like. In addition, in the present embodiment, fields, information elements, or the like included the RRC signaling and described in ASN.1 may be paraphrased as information or parameters. Further, a message related to reconfiguration of an RRC connection may be an RRC reconfiguration message in NR or an RRC connection reconfiguration message in E-UTRA.

Various present embodiments will be described based on the foregoing description. Further, each process described above may be applied to each process to be omitted in the following description.

Figure 5:
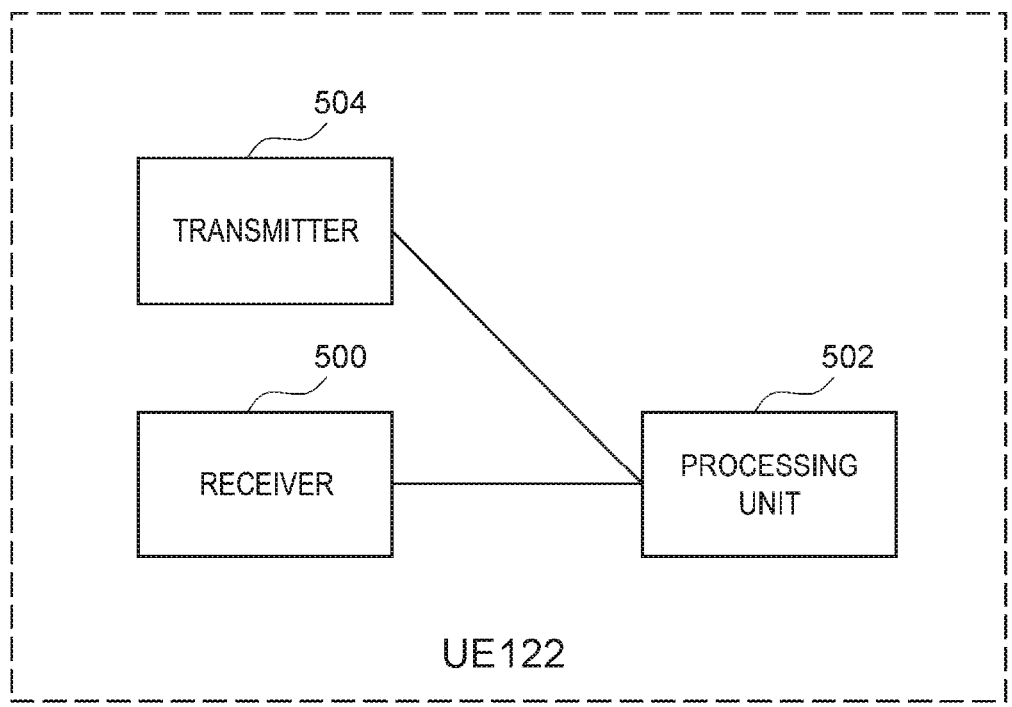
FIG. 5 is a block diagram illustrating a configuration of a terminal apparatus according to the present embodiment.

FIG. 5 is a block diagram illustrating a configuration of the terminal apparatus (UE 122) according to the present embodiment. Further, FIG. 5 illustrates only the main constituent parts closely related to the present embodiment in order to avoid complexity of description.

The UE 122 illustrated in FIG. 5 includes a receiver 500 that receives RRC signaling, and the like from a base station apparatus, a processing unit 502 that performs processing using a parameter included in a received message, and a transmitter 504 that transmits RRC signaling, and the like to the base station apparatus. The above-described base station apparatus may be the eNB 102 or the gNB 108. In addition, the processing unit 502 may include some or all of the functions of the various layers (e.g., the physical layer, the MAC layer, the RLC layer, the PDCP layer, the SDAP layer, the RRC layer, and the NAS layer). In other words, the processing unit 502 may include some or all of a physical layer processing unit, an MAC layer processing unit, an RLC layer processing unit, a PDCP layer processing unit, an SDAP processing unit, an RRC layer processing unit, and a NAS layer processing unit.

Figure 6:
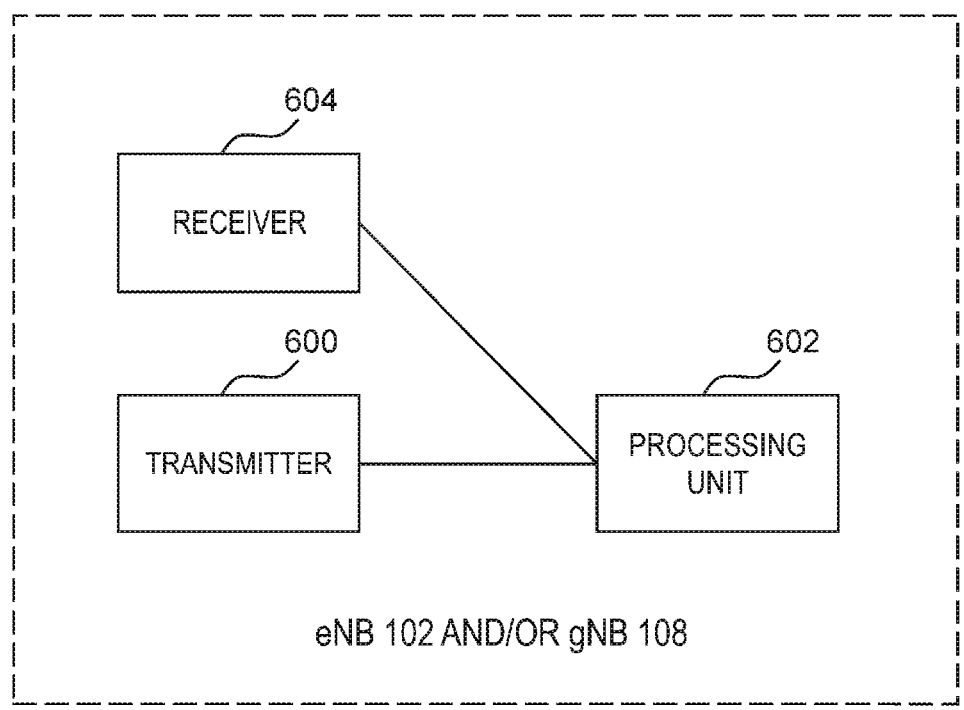
FIG. 6 is a block diagram illustrating a configuration of a base station apparatus according to the present embodiment.

FIG. 6 is a block diagram illustrating a configuration of the base station apparatus according to the present embodiment. Further, FIG. 6 illustrates only the main constituent parts closely related to the present embodiment in order to avoid complexity of description. The above-described base station apparatus may be the eNB 102 or the gNB 108.

The base station apparatus illustrated in FIG. 6 includes a transmitter 600 that transmits RRC signaling, and the like to the UE 122, a processing unit 602 that creates RRC signaling including a parameter and transmits the RRC signaling to the UE 122 to cause the processing unit 502 of the UE 122 to process the RRC signaling, and a receiver 604 that receives RRC signaling and the like from the UE 122. In addition, the processing unit 602 may include some or all of the functions of the various layers (e.g., the physical layer, the MAC layer, the RLC layer, the PDCP layer, the SDAP layer, the RRC layer, and the NAS layer). In other words, the processing unit 602 may include some or all of a physical layer processing unit, an MAC layer processing unit, an RLC layer processing unit, a PDCP layer processing unit, an SDAP processing unit, an RRC layer processing unit, and a NAS layer processing unit.

An exemplary process of the terminal apparatus in the present embodiment will be described using FIG. 9.

Figure 9:
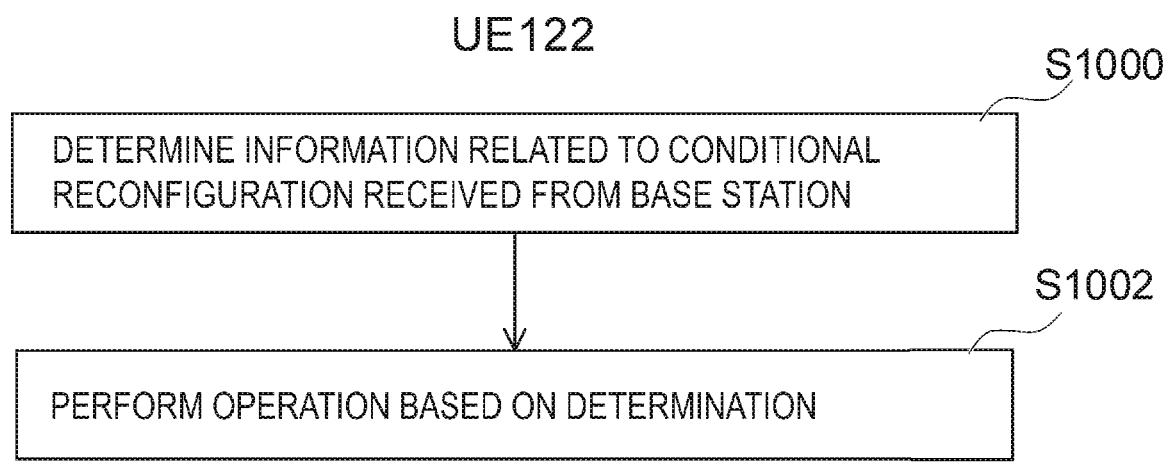
FIG. 9 illustrates an exemplary process regarding an operation of the terminal apparatus according to the present embodiment.

FIG. 9 is a flowchart showing exemplary processing of the terminal apparatus (UE 122) according to the present embodiment. The processing unit 502 of the UE 122 determines information related to a conditional reconfiguration received from the base station apparatus (the eNB 102 and/or the gNB 108) (step S1000) in a case that an RRC connection reconfiguration is to be performed by performing a conditional reconfiguration, and performs an operation based on the determination (step S1002).

Figure 8:
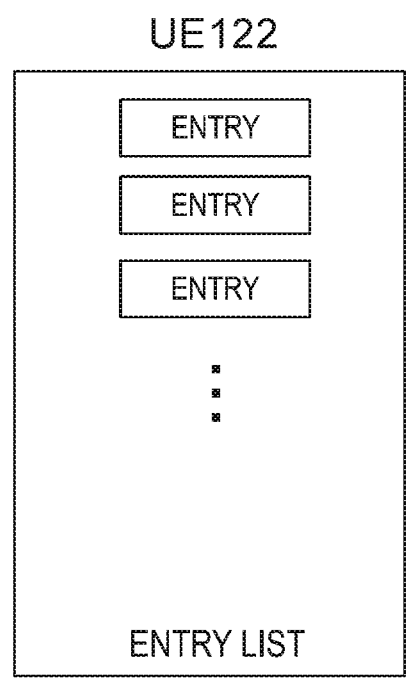
FIG. 8 is a diagram illustrating a structure of an information list according to the present embodiment.

The UE 122 may hold an entry list for a conditional reconfiguration. As illustrated in FIG. 8, the entry list may include one or more entries. Each entry may include one entry identity, one or more execution conditions, and one conditional reconfiguration information element.

The UE 122 may receive RRC signaling including the information related to the conditional reconfiguration, add one or more entries to the entry list, and/or modify one or more entries of the entry list based on the addition/modification list included in the information related to the conditional reconfiguration. The entry addition/modification list may include one or more entries.

Determining the information related to the conditional reconfiguration in step S1000 may mean determining whether one or more entries including an entry including the conditional reconfiguration information element applied at the time when the conditional reconfiguration is performed, for example, are to be deleted from the entry list. In this case, the operation may mean that in a case that it is determined not to delete one or more entries including the entry including the conditional reconfiguration information element applied at the time when the conditional reconfiguration is performed, an execution condition included in the same entry as that including the conditional reconfiguration information element applied at the time when the conditional reconfiguration is performed is not to be evaluated for the conditional reconfiguration.

In addition, determining the information related to the conditional reconfiguration in step S1000 may mean, for example, determining whether the conditional reconfiguration has been performed. In this case, the operation may mean that in a case that the conditional reconfiguration is performed, the execution condition included in the same entry as that including the conditional reconfiguration information element applied at the time when the conditional reconfiguration is performed is not to be evaluated for the conditional reconfiguration. In this case, the operation may mean that in the case that the conditional reconfiguration is performed, an execution condition included in a different entry from that including the conditional reconfiguration information element applied at the time when the conditional reconfiguration is performed is to be evaluated for the conditional reconfiguration.

Further, performing an RRC connection reconfiguration by performing a conditional reconfiguration may mean performing an RRC connection reconfiguration based on the conditional reconfiguration information element of the entry included in the entry list. In addition, the conditional reconfiguration information element of the entry included in the entry list may include a synchronized reconfiguration information element, and in this case, performing the RRC connection reconfiguration by performing a conditional reconfiguration may mean performing a RRC connection reconfiguration based on the conditional reconfiguration information element of the entry included in the entry list, including the synchronized reconfiguration information element.

An exemplary process of the UE 122 will be described using FIG. 9. The processing unit 502 of the UE 122 determines information related to a conditional reconfiguration (step S1000), and performs an operation based on the determination (step S1002).

Determining information related to a conditional reconfiguration in step S1000 may mean, for example, determining whether a candidate SpCell indicated by the entry included in the entry list is identical to the SpCell currently configured for the UE 122. In this case, the operation based on the determination may mean that in a case that the candidate SpCell indicated by the entry included in the entry list is determined to be identical to the SpCell currently configured for the UE 122, an execution condition included in an entry including the configuration of the same candidate SpCell as the SpCell currently configured for the UE 122 is not to be evaluated. In addition, in this case, the operation based on the determination may mean that in a case that the candidate SpCell indicated by the entry included in the entry list is determined to be different from the SpCell currently configured for the UE 122, an execution condition included in an entry including the configuration of a different candidate SpCell from the SpCell currently configured for the UE 122 is to be evaluated. Further, the candidate SpCell being identical to the SpCell currently configured for the UE 122 may mean that the physical cell identity (PCI) of the candidate SpCell is the same as the physical cell identity of the SpCell currently configured for the UE 122.

In this way, the terminal apparatus (UE 122) can determine the information related to the conditional reconfiguration received from the base station apparatus (eNB 102 and/or gNB 108) and efficiently configure whether an execution condition of any entry included in an entry list is to be evaluated based on the determination according to the above-described embodiment.

The radio bearer in the above description may be a DRB, an SRB, or a DRB and an SRB unless otherwise stated.

In the above description, the expressions such as "linked", "associated", "related", and the like may be paraphrased as one another.

In the above description, the expressions such as "included" "being included", "has been included", and the like may be paraphrased as one another.

In the above description, "the" may be paraphrased as "the above-described".

In the above description, "SpCell of an SCG" may be paraphrased as "PSCell".

In the above description, the expressions such as "confirmed to be", "being configured", "included", and the like may be paraphrased as one another.

In the above description, the "dormant state" may be paraphrased as the "deactivated state", and a "state resulting from resuming from the dormant state" may be paraphrased as the "activated state". In the above description, "activated" and "deactivated" may be paraphrased as "activated state" and "deactivated state", respectively.

In the above description, "transit from X to Y" may be paraphrased as "become Y from X". In the above description, "caused to transit" may be paraphrased as "determine a transition".

In addition, some or all of the steps in each exemplary process or the exemplary flow of each process in the above description may not be performed. In addition, the order of the steps in each exemplary process or the exemplary flow of each process in the above description may vary. In addition, some or all of process in each step in each exemplary process or the exemplary flow of each process in the above description may not be performed. In addition, the order of the processes in each step in each exemplary process or the exemplary flow of each process in the above description may vary. In addition, in the above description, "perform B based on being A" may be paraphrased as "perform B. That is, "perform B" may be performed independently of "being A".

Further, in the above description, "A may be paraphrased as B" may include the meaning that B is paraphrased as A in addition to the meaning that A is paraphrased as B. In addition, the description "C may be D" and "C may be E" above may include "D may be E". In addition, the description "F may be G" and "G may be H" above may include "F may be H".

In addition, in the above description, in a case that a condition "A" conflicts a condition "B", the condition "B" may be expressed as "another" condition of the condition "A".

A program running on an apparatus related to the present embodiment may serve as a program that controls a Central Processing Unit (CPU) and the like to cause a computer to operate in such a manner as to implement the functions in the present embodiment. Programs or the information handled by the programs are temporarily loaded into a volatile memory such as a Random Access Memory (RAM) while being processed, or stored in a non-volatile memory such as a flash memory, or a Hard Disk Drive (HDD), and then read, modified, and written by the CPU, as necessary.

Further, the apparatuses of the above-described embodiment may be partially implemented by a computer. In such a case, a program for implementing such control functions may be implemented by being recorded on a computer-readable recording medium to cause a computer system to read and execute the program recorded on this recording medium. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed with an electric circuit, that is, typically an integrated circuit or multiple integrated circuits. An electric circuit designed to perform the functions described in the present specification may include a general-purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Further, the present embodiment is not limited to the above-described embodiments. Although apparatuses have been described as an example in the embodiment, the present embodiment is not limited to these apparatuses, and is applicable to a stationary type or a non-movable type electronic equipment installed indoors or outdoors such as a terminal apparatus or a communication apparatus of, for example, AV equipment, kitchen equipment, a cleaning or washing machine, air-conditioning equipment, office equipment, a vending machine, and other household appliances.

Although, the embodiments have been described in detail referring to the drawings, the specific configuration is not limited to the embodiments and includes, for example, design changes within the scope not departing from the gist of the embodiments. Furthermore, various modifications are possible within the scope of the present embodiments defined by claims, and embodiments that are made by suitably combining technical means disclosed according to the different embodiments are also included in the technical scope of the present embodiments of the present invention. In addition, a configuration in which components, which are described in the embodiment described above, having similar effects are interchanged is also included in the present invention.

REFERENCE SIGNS LIST

100 E-UTRA
102 eNB
104 EPC
106 NR
108 gNB
110 5GC
112, 114, 116, 118, 120, 124 Interface
122 UE
200, 300 PHY
202, 302 MAC
204, 304 RLC
206, 306 PDCP
208, 308 RRC
310 SDAP
210, 312 NAS
500, 604 Receiver
502, 602 Processing unit
504, 600 Transmitter

The invention claimed is:

1. A terminal apparatus for communicating with a base station apparatus, the terminal apparatus comprising:
a receiver configured to receive radio resource control (RRC) signaling transmitted from the base station apparatus; and
a processing unit configured to hold an entry list, wherein the entry list includes one or more entries,
an entry of the one or more entries includes a conditional reconfiguration information element associated with one candidate special cell (SpCell) and one or more execution conditions,
the processing unit adds one or more entries to the entry list and/or modifies one or more entries of the entry list based on an entry addition/modification list included in information related to a conditional reconfiguration of the received RRC signaling, and
the processing unit further determines whether the candidate SpCell associated with the conditional reconfiguration information element of the entry is identical to an SpCell currently configured for the terminal apparatus, and causes an execution condition of the one or more execution conditions to not be evaluated, the execution condition being included in the entry including the conditional reconfiguration information element of which the associated candidate SpCell is identical to the SpCell currently configured for the terminal apparatus.

2. A method of a terminal apparatus for communicating with a base station apparatus, the method comprising:
receiving radio resource control (RRC) signaling transmitted from the base station apparatus;
holding an entry list;
adding one or more entries to the entry list and/or modifying one or more entries of the entry list based on an entry addition/modification list included in information related to a conditional reconfiguration of the received RRC signaling; and further determining whether one candidate special cell (SpCell) associated with a conditional reconfiguration information element of an entry of the one or more entries is identical to a special cell (SpCell) currently configured for the terminal apparatus, and not causing an execution condition to not be evaluated, the execution condition being included in the entry including the conditional reconfiguration information element of which the associated candidate SpCell is identical to the SpCell currently configured for the terminal apparatus, wherein
the entry list includes one or more entries, and
the one entry includes the conditional reconfiguration information element associated with the candidate special cell (SpCell) and one or more execution conditions.

3. An integrated circuit mounted on a terminal apparatus for communicating with a base station apparatus, the integrated circuit causing the terminal apparatus to perform:
receiving radio resource control (RRC) signaling transmitted from the base station apparatus;
holding an entry list;
adding one or more entries to the entry list and/or modifying one or more entries of the entry list based on an entry addition/modification list included in information related to a conditional reconfiguration of the received RRC signaling; and, further determining whether one candidate special cell (SpCell) associated with a conditional reconfiguration information element of an entry of the one or more entries is identical to a special cell (SpCell) currently configured for the terminal apparatus, and not causing an execution condition to be evaluated, the execution condition being included in the entry including the conditional reconfiguration information element of which the associated candidate SpCell is identical to the SpCell currently configured for the terminal apparatus, wherein the entry list includes one or more entries, and the one entry includes the conditional reconfiguration information element associated with the candidate special cell (SpCell) and one or more execution conditions.

* * * * *